United States Patent [19]

Schlang

[11] 3,868,636

[45] Feb. 25, 1975

[54] OPTICAL CHARACTER READER HAVING FEATURE RECOGNITION CAPABILITY

[75] Inventor: Arthur Schlang, Woodbury, N.Y.

[73] Assignee: Isotec Incorporated, Plainview, N.Y.

[22] Filed: June 18, 1973

[21] Appl. No.: 371,163

[52] U.S. Cl. .................. 340/146.3 J, 340/146.3 Y, 340/146.3 AC

[51] Int. Cl. ............................................. G06k 9/12

[58] Field of Search ............ 340/146.3 AC, 146.3 J, 340/146.3 AG, 146.3 H, 146.3 ED, 146.3 R, 146.3 Y

[56] References Cited

UNITED STATES PATENTS

| | | | |
|---|---|---|---|
| 3,140,466 | 7/1964 | Greanias et al. | 340/146.3 AC |
| 3,160,855 | 12/1964 | Holt | 340/146.3 ED |
| 3,568,151 | 3/1971 | Majima | 340/146.3 AG |
| 3,582,883 | 6/1971 | Shepard et al. | 340/146.3 J |
| 3,587,047 | 6/1971 | Cutaia | 340/146.3 H |
| 3,613,081 | 10/1971 | Morimoto | 340/146.3 J |
| 3,651,461 | 3/1972 | Holt | 340/146.3 AC |

*Primary Examiner*—Gareth D. Shaw
*Assistant Examiner*—Leo H. Boudreau
*Attorney, Agent, or Firm*—Edward H. Loveman, Esq.

[57] ABSTRACT

The invention is applicable to single line, multiple line and page reading applications. An optical character reader includes an electro-optical sensor for scanning a line of graphic characters on a character bearing medium to derive electrical signals corresponding to configurations of the characters. A sensor processor amplifies the signals, quantizes the amplified signals and correlates them to reduce the effects of optical noise. A feature generation circuit including a plurality of feature data generators applies predetermined tests to determine the presence or absence of specified character features and forwards corresponding feature data signals to an algorithm circuit. The algorithm circuit applies predetermined criteria to the feature data signals according to truth tables set up for the several forms of characters recognizable by the system, to identify the characters being read. The algorithm circuit produces decimal data which is fed to a decimal to binary converter.

15 Claims, 45 Drawing Figures

COUNT STORAGE

PATENTED FEB 25 1975 3,868,636

SHEET 02 OF 22

SENSOR PROCESSING

PATENTED FEB 25 1975 3,868,636

SHEET 06 OF 22

STROKE SEQUENCE PROCESSOR

TWO TYPES OF NUMERAL NINE WITH TWO AND THREE LEADING EDGES

LEADING EDGE CONTROL
AND
FINAL ONE SEQUENCE

LEADING EDGE PROCESSING

LEFT-RIGHT MEMORY

CONTROL SIGNALS

SECOND STROKE FALL NUMERALS

THIRD STROKE FEATURE

DISCRIMINATOR

FINAL VALUE PROCESSING

SADDLE FEATURE

SADDLE DETECTOR MODES

SADDLE AND NUMERAL "1" COUNT

SECOND STROKE FALL DETECTOR

THIRD STROKE RISE DETECTOR

NUMERAL "1" LOGIC

TYPICAL NON-PREFERRED NUMERAL FORMATIONS

TWO-COUNT SEQUENCE NUMERALS

NUMERAL "O" LOGIC CIRCUIT

| ITEM | NUMERAL FORM | FIG. 14A | | | FIG. 17B | | | | FIG. 9 | FIG. 20 | FIG. 14B |
|---|---|---|---|---|---|---|---|---|---|---|---|
| | | $S_1$ | $S_2$ | $S_3$ | $S_4$ | $S_5$ | $S_6$ | $S_7$ | 2 - 2 SEQUENCE | SADDLE | FINAL VALUE |
| 1 | 2 | 1 | 0 | 0 | 0 | 0 | 1 | 1 | 0 | 1 | — |
| 2 | 2 | 1 | 0 | 0 | 1 | 0 | 1 | 1 | 0 | 1 | — |
| 3 | 2 | 1 | 0 | 0 | 1 | 0 | 1 | 1 | 1 | 1 | — |
| 4 | 2 | 1 | 0 | 1 | 0 | 0 | 1 | 1 | 0 | 0 | $S_3$ |
| 5 | 2 | 1 | 0 | 1 | 1 | 0 | 1 | 1 | 0 | 0 | $S_3$ |
| 6 | 2 | 1 | 0 | 1 | 0 | 0 | 1 | 1 | 0 | 1 | — |
| 7 | 2 | 1 | 0 | 1 | 1 | 0 | 1 | 1 | 0 | 1 | — |
| 8 | 2 | 1 | 0 | 1 | 1 | 0 | 1 | 1 | 1 | 1 | — |
| 9 | 2 | 0 | 1 | 1 | 0 | 1 | 1 | 0 | 0 | 0 | — |
| 10 | 2 | 0 | 1 | 1 | 0 | 1 | 1 | 1 | 0 | 0 | — |
| 11 | 2 | 1 | 1 | 1 | 0 | 1 | 1 | 1 | 0 | 0 | — |
| 12 | 2 | 1 | 1 | 1 | 0 | 1 | 1 | 1 | 0 | 0 | — |
| 13 | 2 | 1 | 1 | 1 | 0 | 1 | 1 | 0 | 0 | 0 | — |
| 14 | 2 | 1 | 1 | 1 | 0 | 1 | 1 | 0 | 0 | 0 | — |
| 15 | 2 | 1 | 1 | 1 | 0 | 1 | 1 | 0 | 0 | 0 | — |
| 16 | 2 | 1 | 1 | 1 | 0 | 1 | 1 | 0 | 0 | 0 | — |
| 17 | 2 | 1 | 1 | 1 | 0 | 1 | 1 | 0 | 1 | 1 | — |

NUMERAL "2"
TRUTH TABLE

FIG. 28A $S_1 \cdot \bar{S}_2 \cdot \bar{S}_3$ $\bar{S}_1 \cdot \bar{S}_2 \cdot S_3$ $\bar{S}_1 \cdot S_2 \cdot \bar{S}_3$

DECIMAL TO BINARY CONVERSION

OPTICAL CHARACTER READER HAVING FEATURE RECOGNITION CAPABILITY

This invention concerns an optical character reader system that is capable of reading handwritten as well as machine printed alphabet and/or numeric symbols or characters. The system depends upon a feature recognition capability, that is, capable of detecting certain singular character nuances that distinguish one character from all the others.

In the present invention the unique aspects of the features chosen are their analytical ability to permit the identification of a character with a minimal amount of hardware. Additionally, the chosen features are insensitive to normal character abberrations and are not prone to errors in interpretation. Character detection techniques are employed that are insensitive to most optical noise phenomena so that clean data is supplied to the Feature Circuits for processing.

This invention involves improvements over those described in my prior patent applications Ser. No. 152,104, Filed June 11, 1971 and Ser. No. 172,138, filed August 16, 1971. The present invention is for the most part directed to the reading of hand printed numerals and some alphabet characters. As a consequence of the versatility of the techniques employed herein, the principles of the invention are readily extended to a full hand printed alphabet. The present system is also capable of identifying machine printed characters because they are fixed in configuration and not subject to random variations found in handwritten and hand printed characters.

The present invention deals with a limited number of character features which, when known, can be combined to uniquely identify the different graphic symbols and characters in their varied forms. In this specification are explained the several techniques by which the extraction of necessary feature data from optically scanned characters is accomplished, and how this data is subsequently algorized in order to obtain the character identity. The invention also involves a method of optical alignment by which an operator can align an optical sensor to accomodate any single line of printing wherever it is located on a document being read, and by duplication means to permit reading of multiple line documents and even full pages.

It is therefore a principal object of the present invention to provide an improved optical character reader which identifies graphic signals by a limited number of character features.

It is another object of the present invention to provide an improved optical character reader having a feature generation circuit arranged to apply predetermined tests to determine the absence or presence of certain specified features of a character.

These and other objects and many of the attendant advantages of this invention will be readily appreciated as the same becomes better understood by reference to the following detailed description when considered in connection with the accompanying drawings in which.

Figure 8:
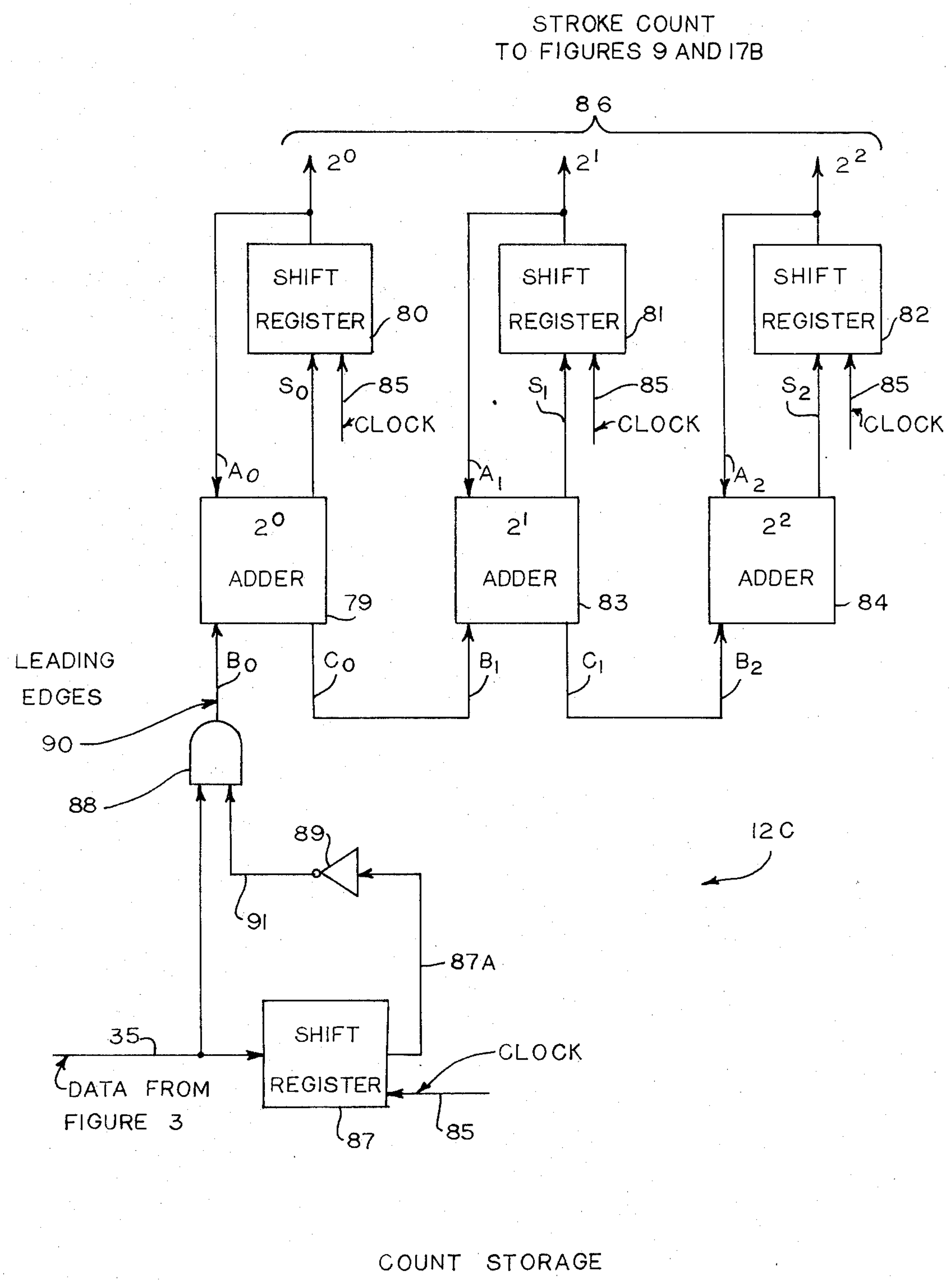
Figure 9:
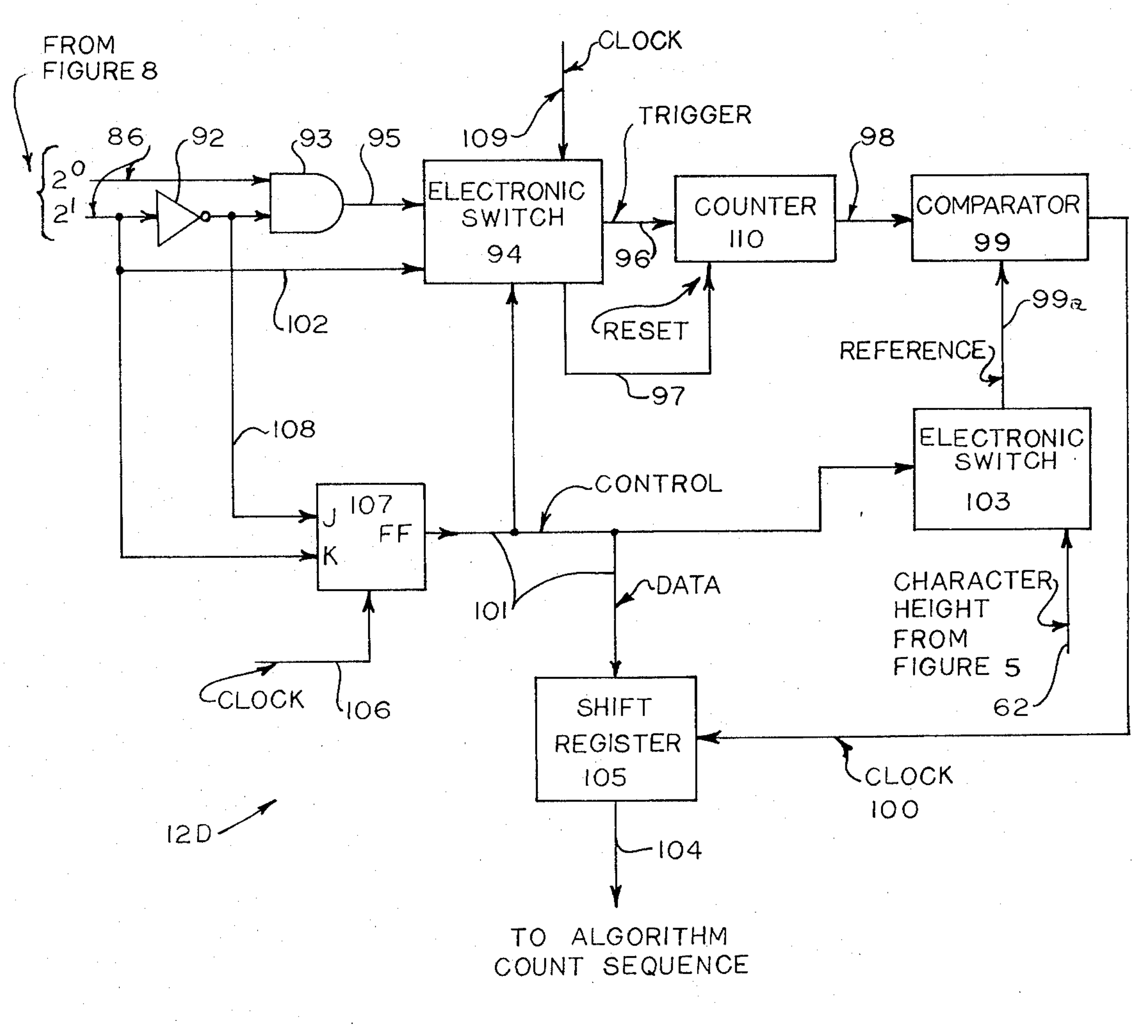
Figure 10:
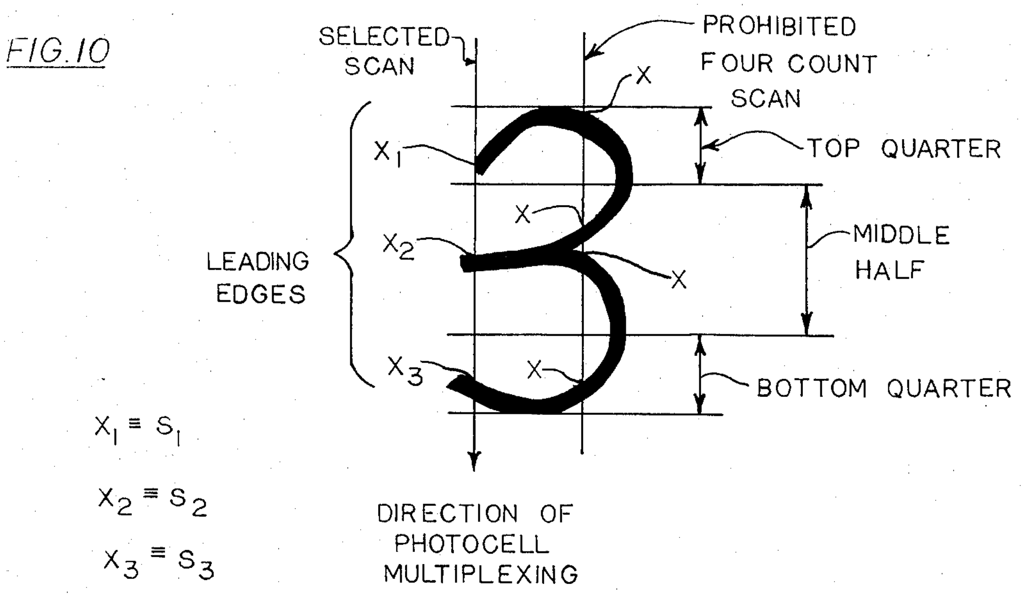
Figure 11:
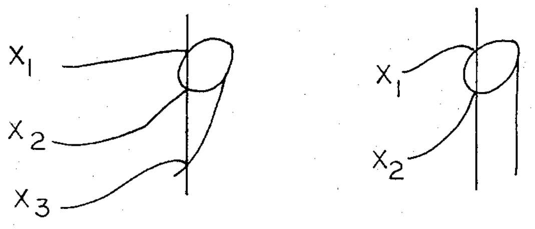
Figure 12:
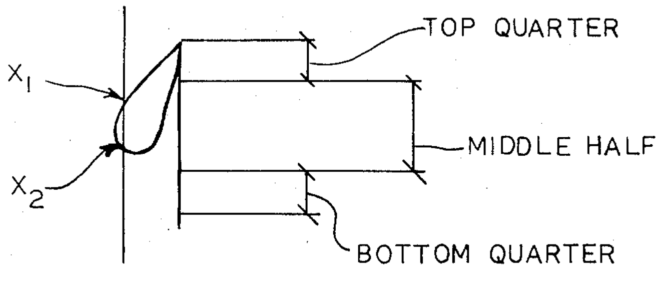
Figure 13:
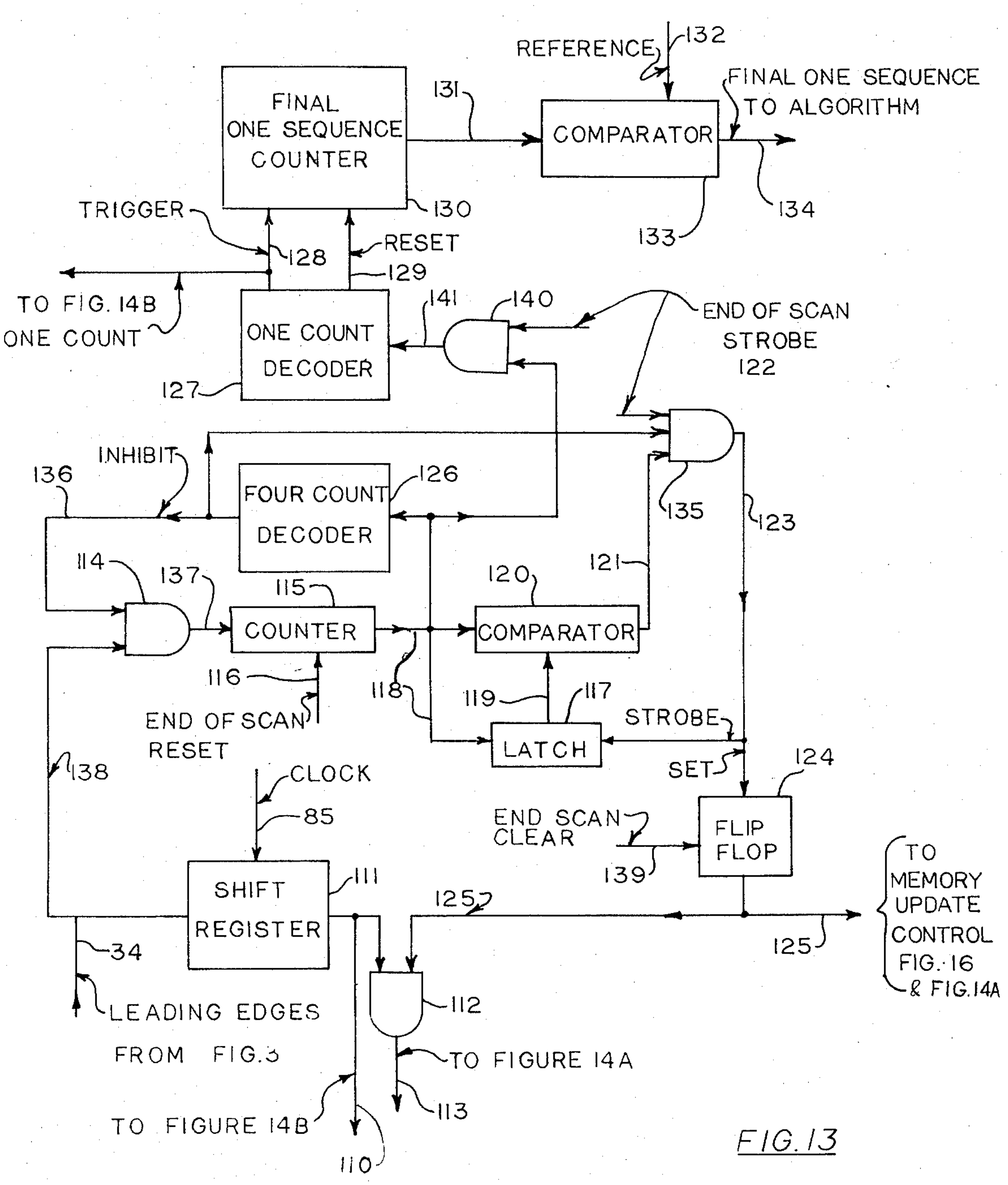
Figure 14A:
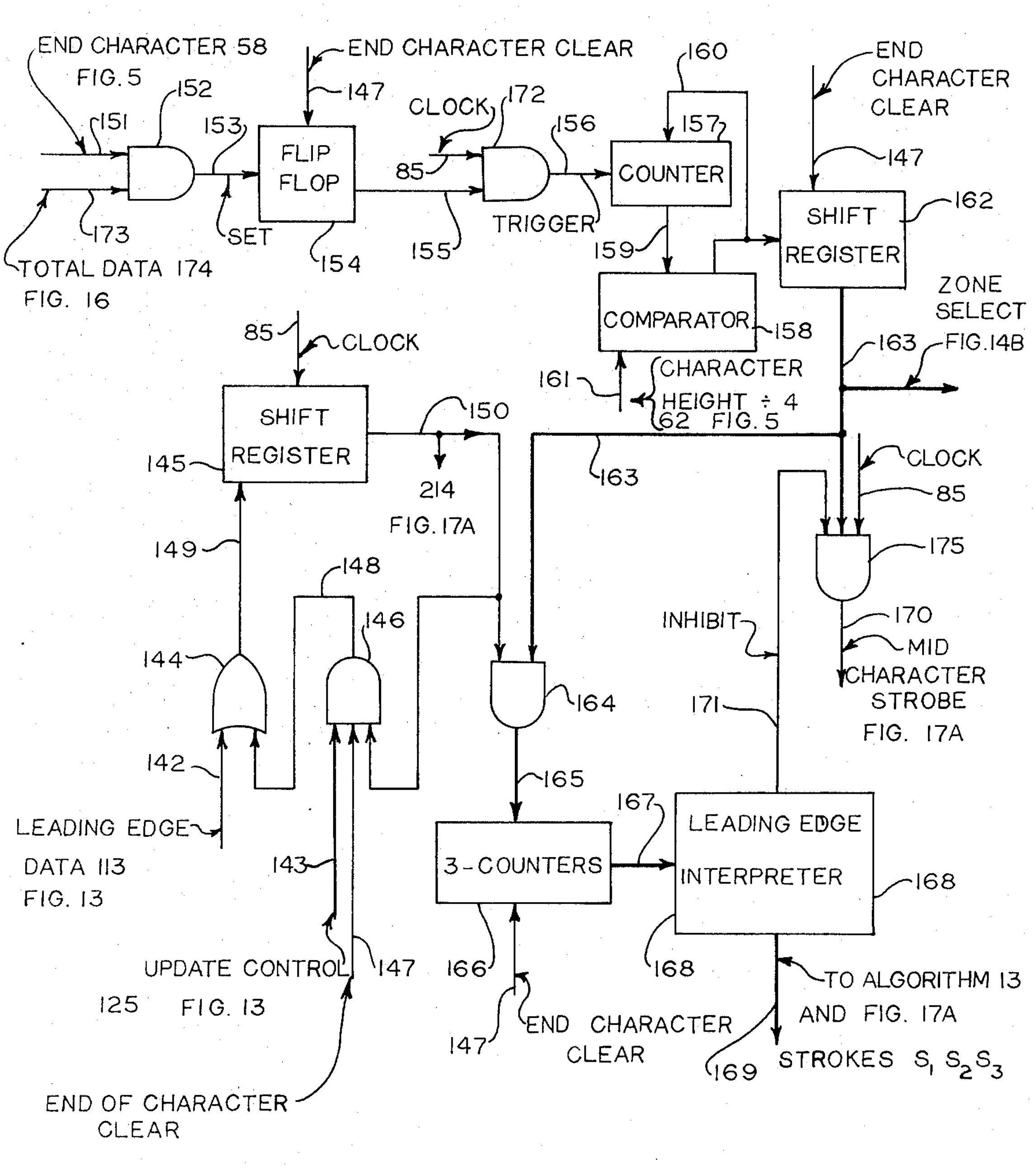
Figure 16:
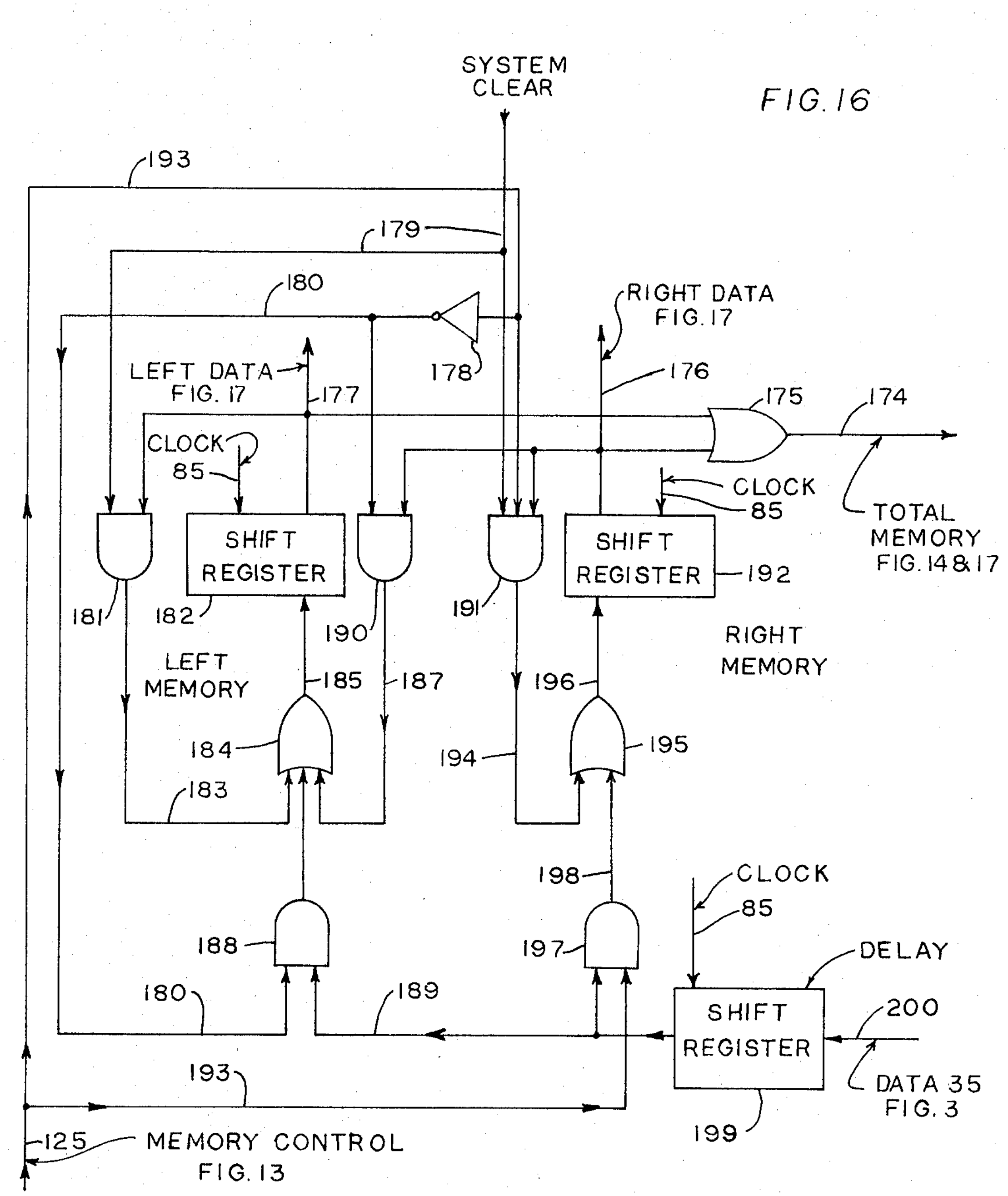
Figure 17A:
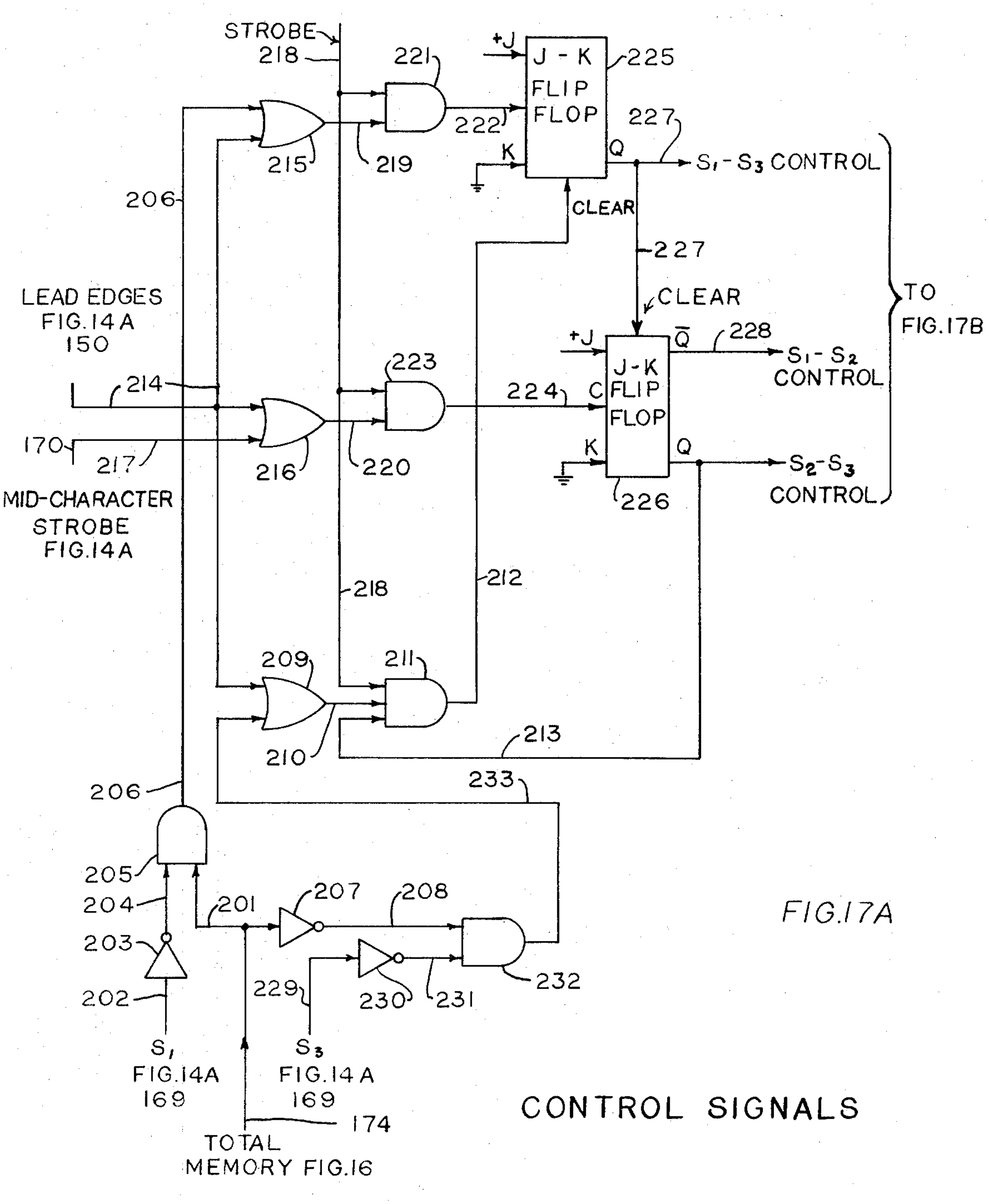
Figure 21:
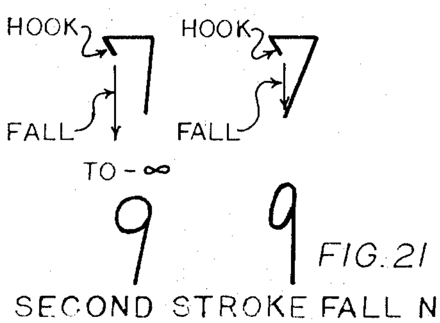
Figure 24:
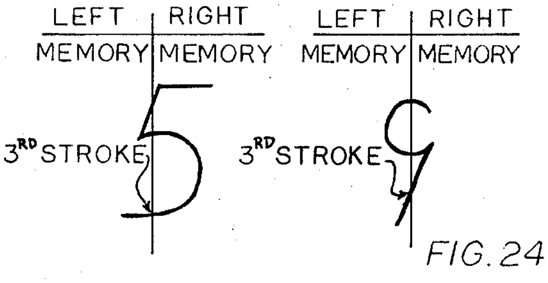
Figure 17B:
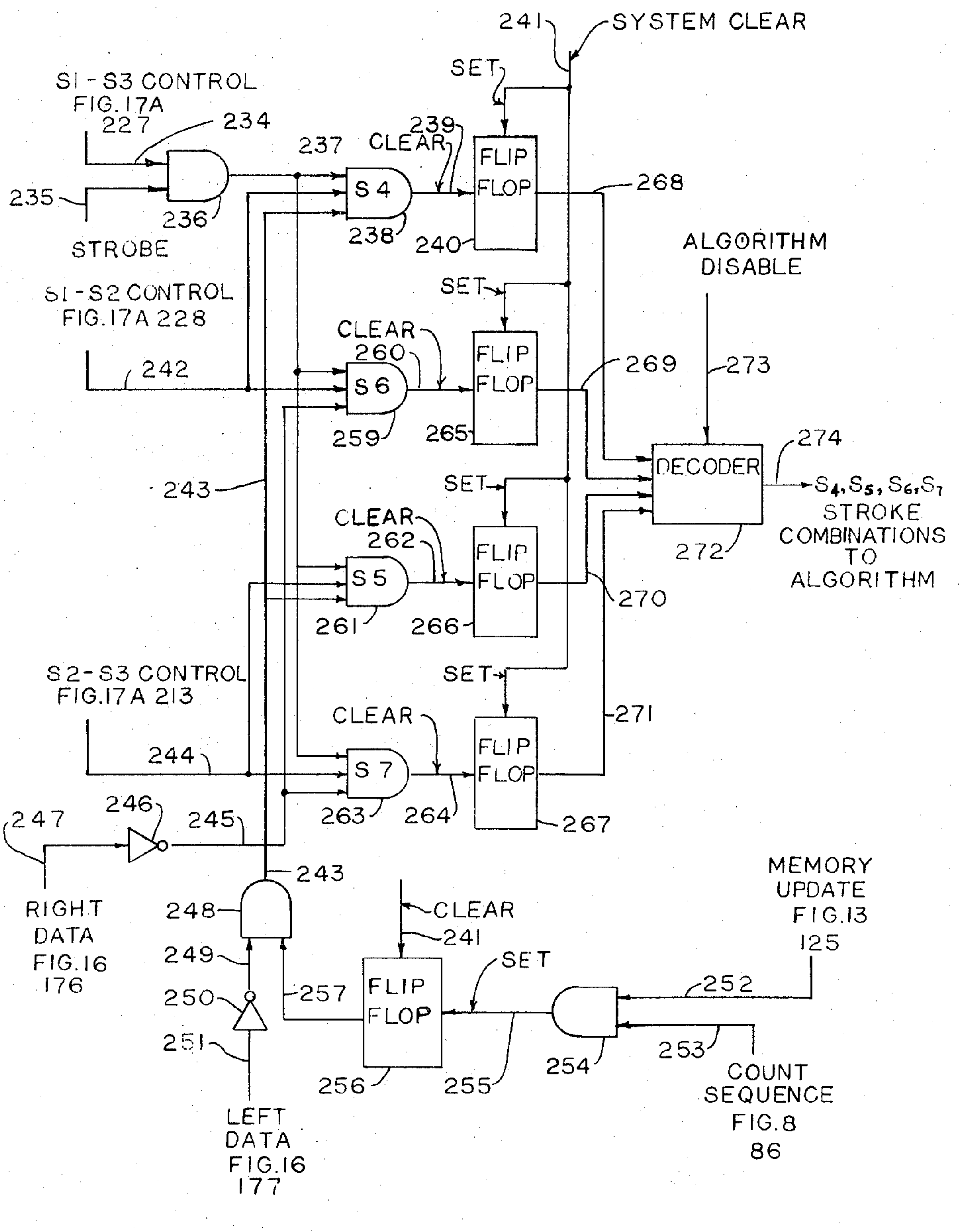
Figure 14B:
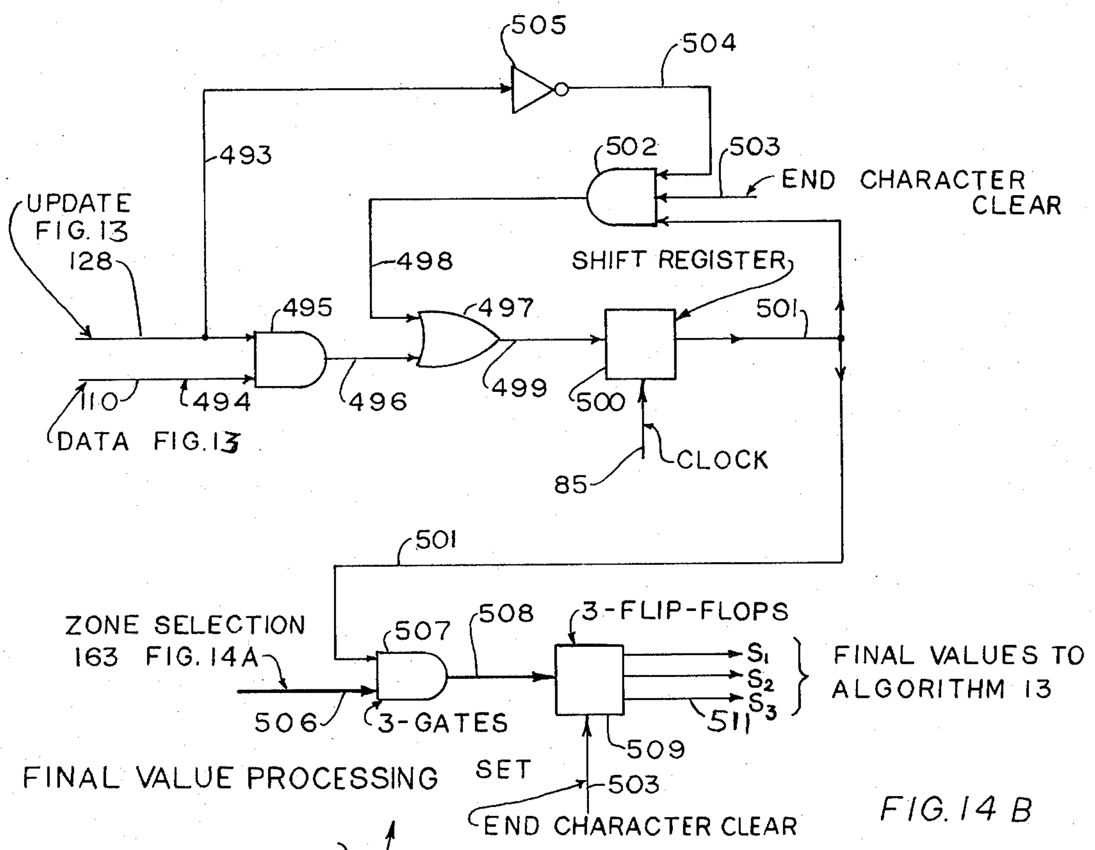
Figure 18:
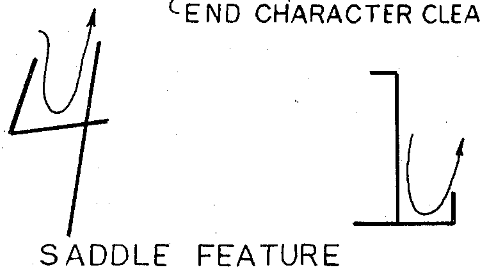
Figure 19:
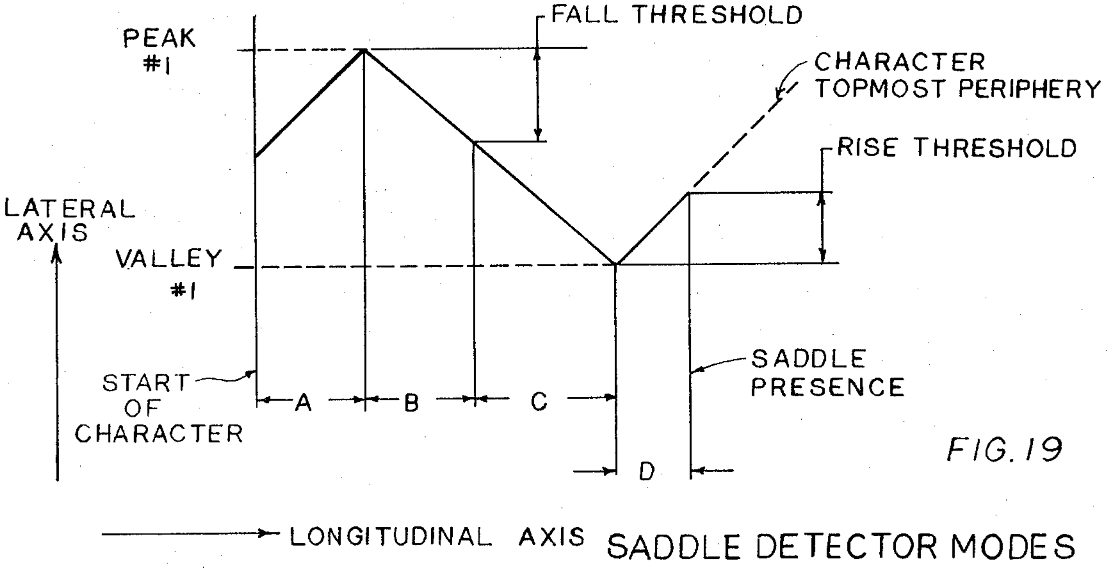
Figure 20:
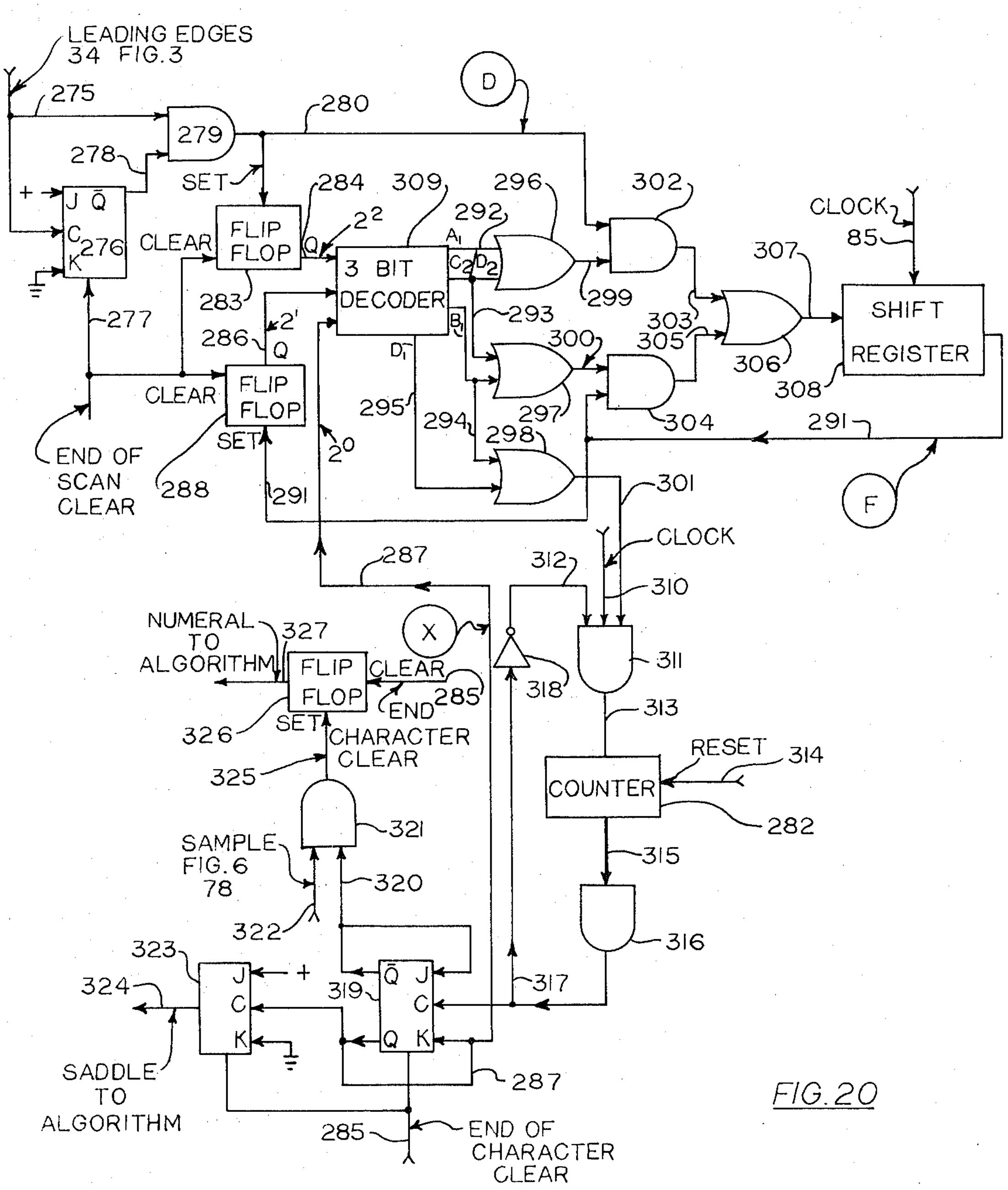
Figure 22:
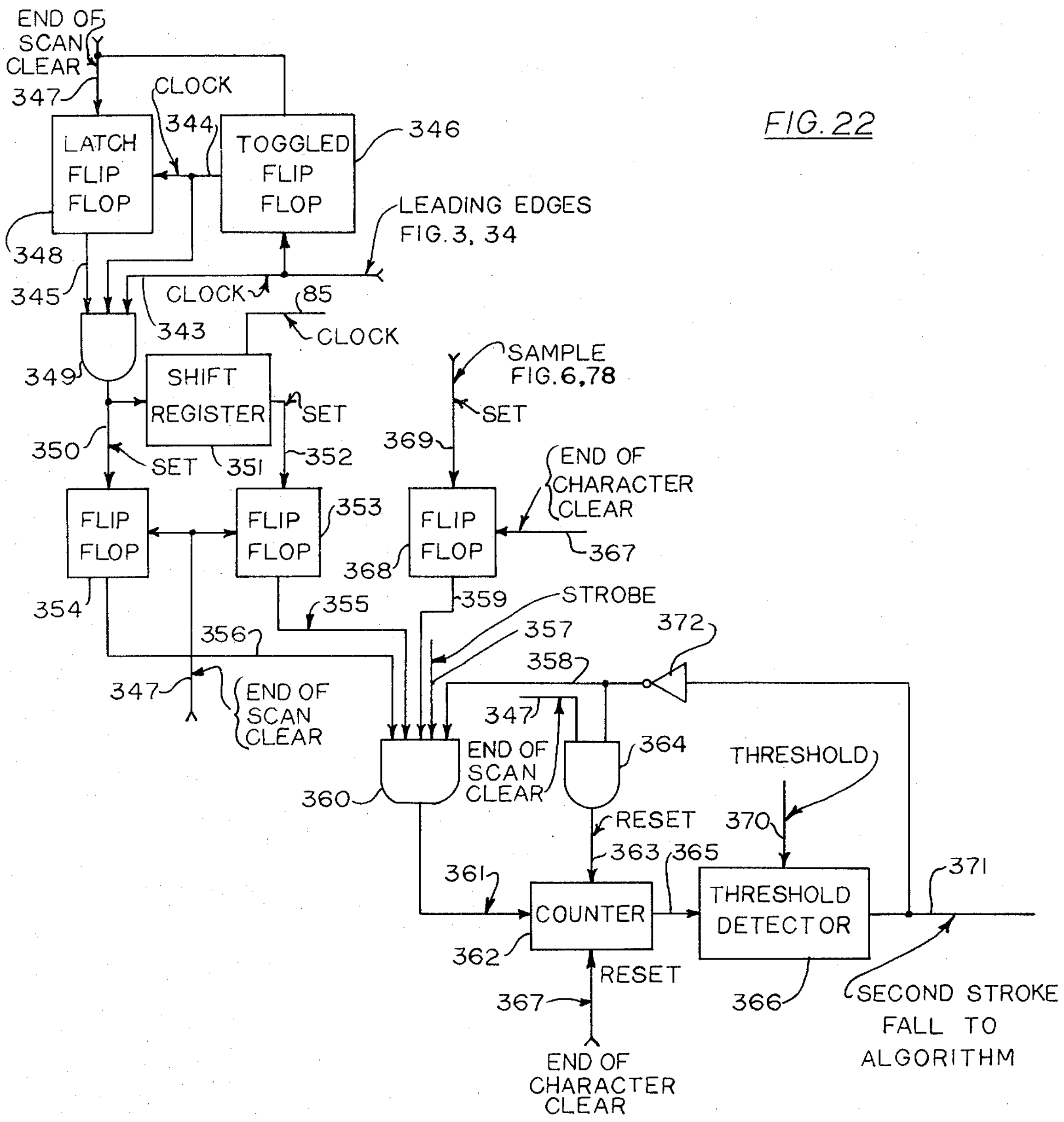
Figure 23:
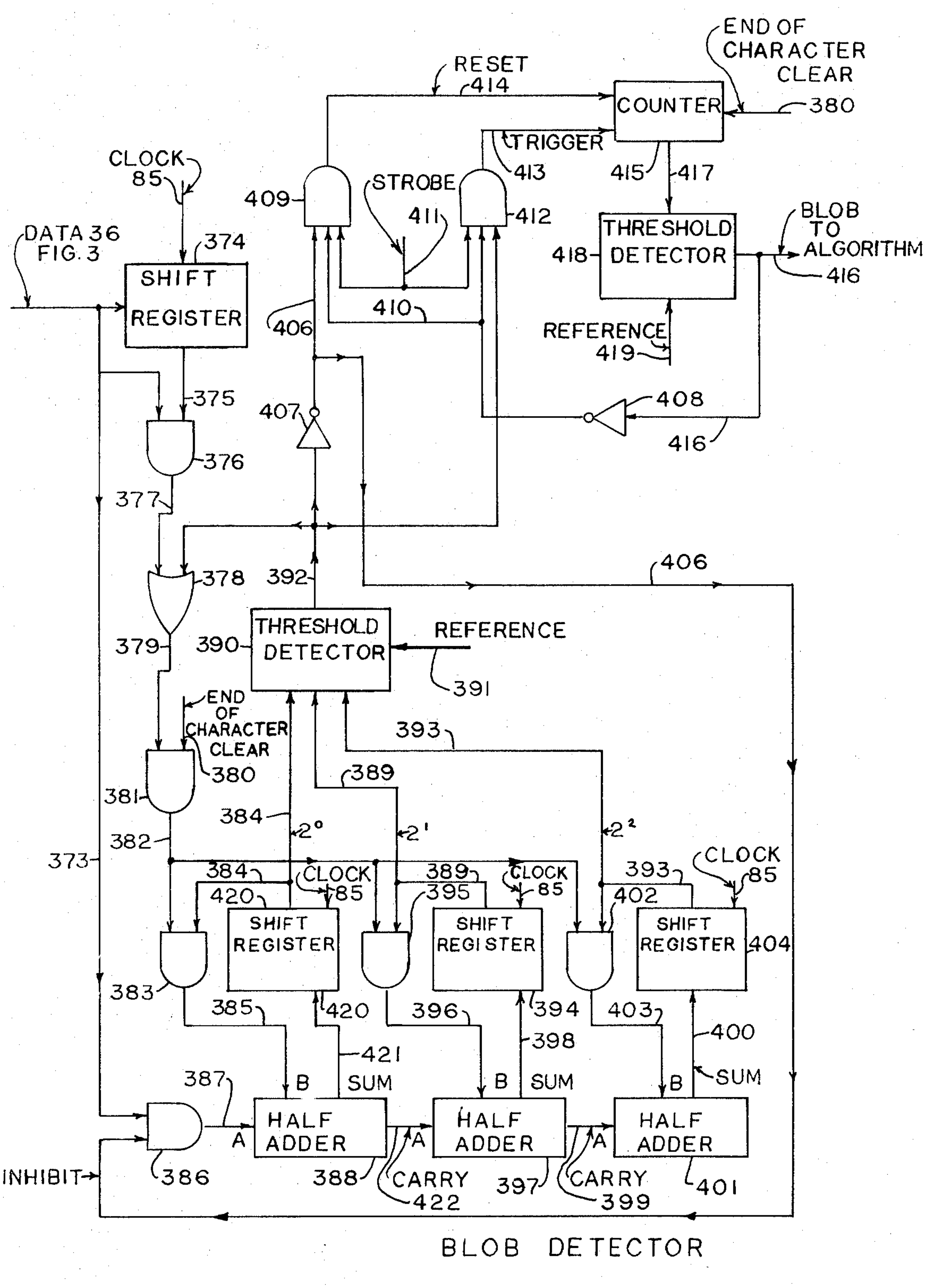
Figure 25:
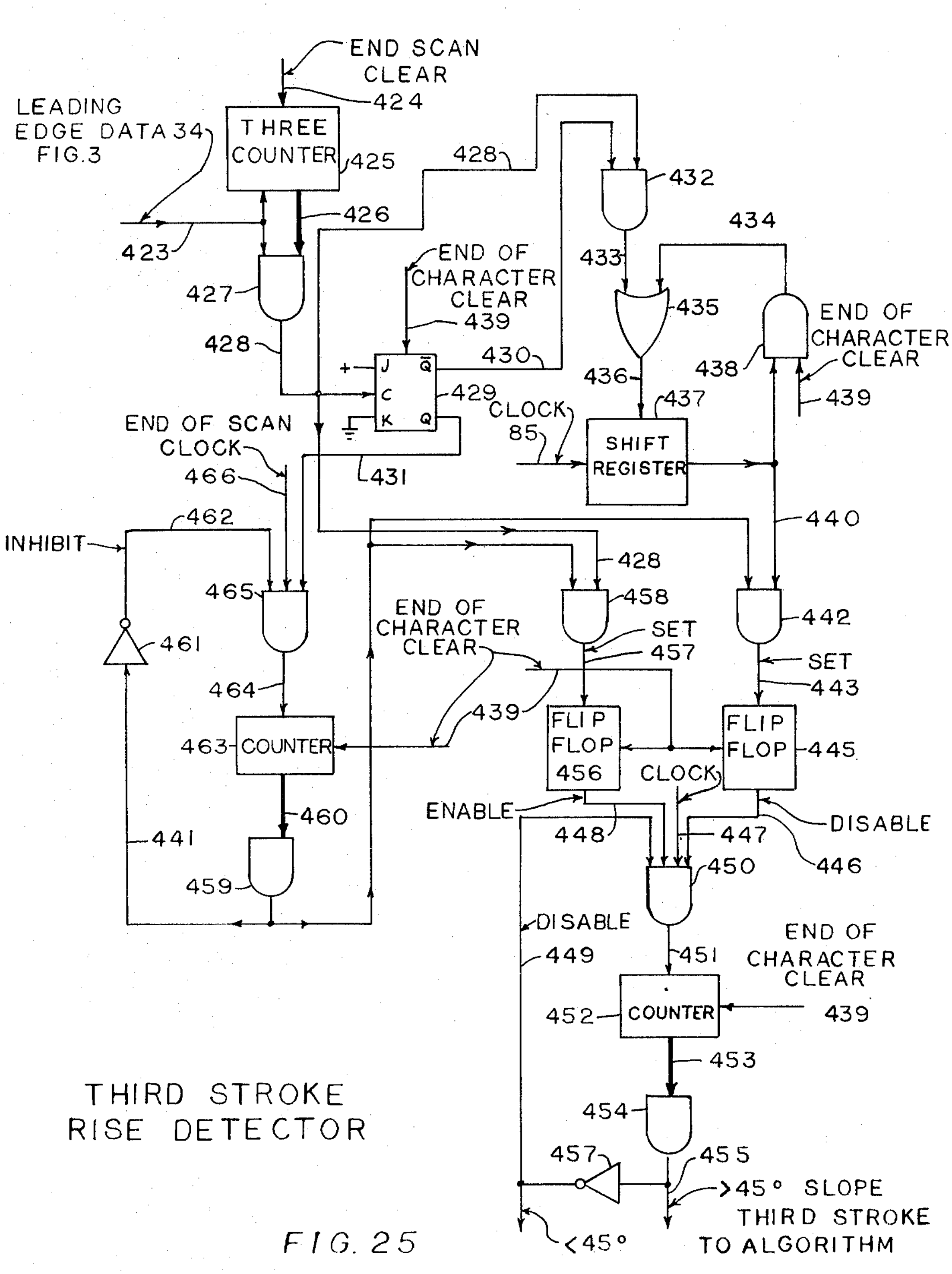
Figure 27E:
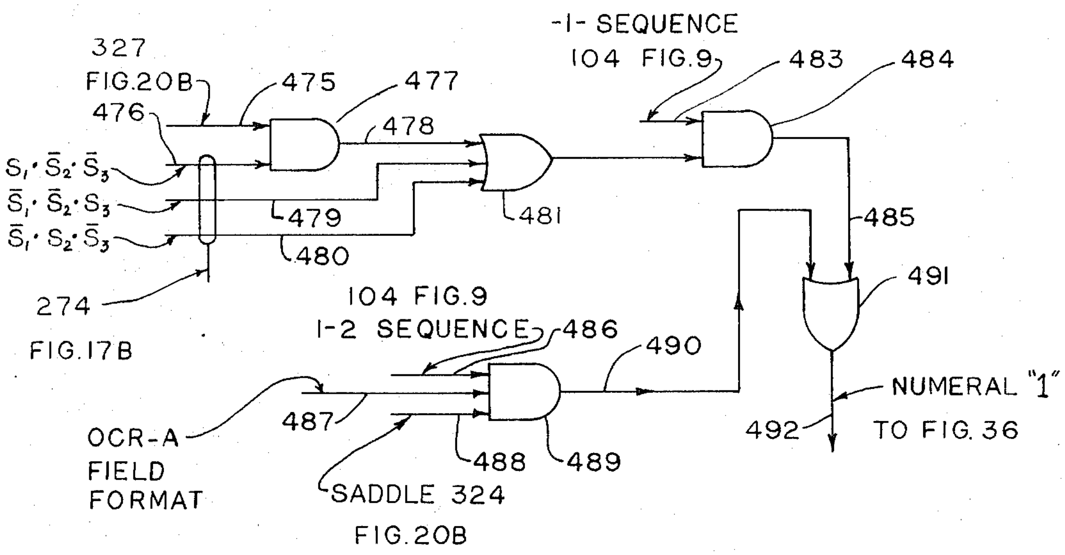
Figure 26:
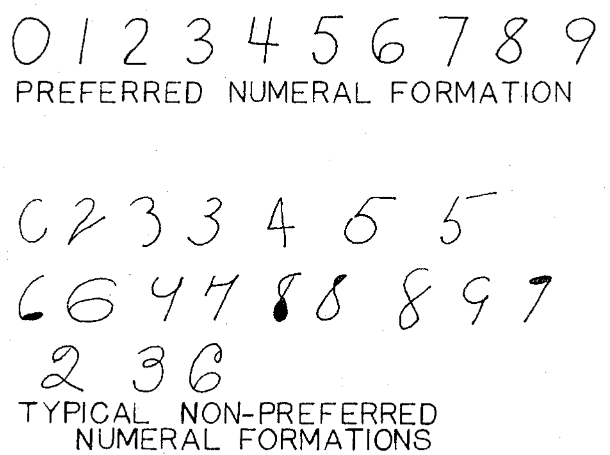
Figure 26A:
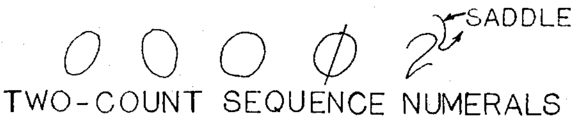
Figure 26B:
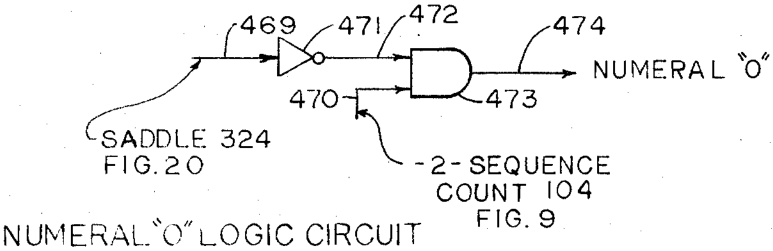
Figure 28B:
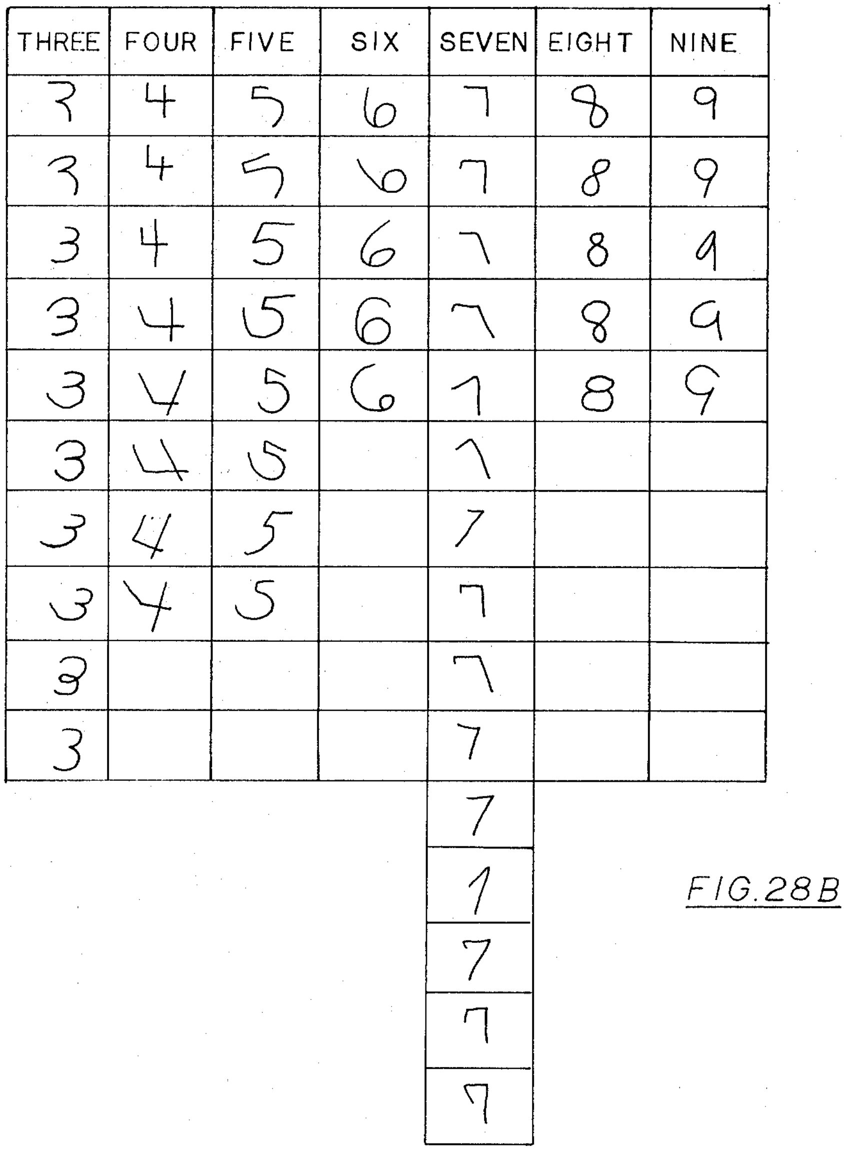
Figure 29:
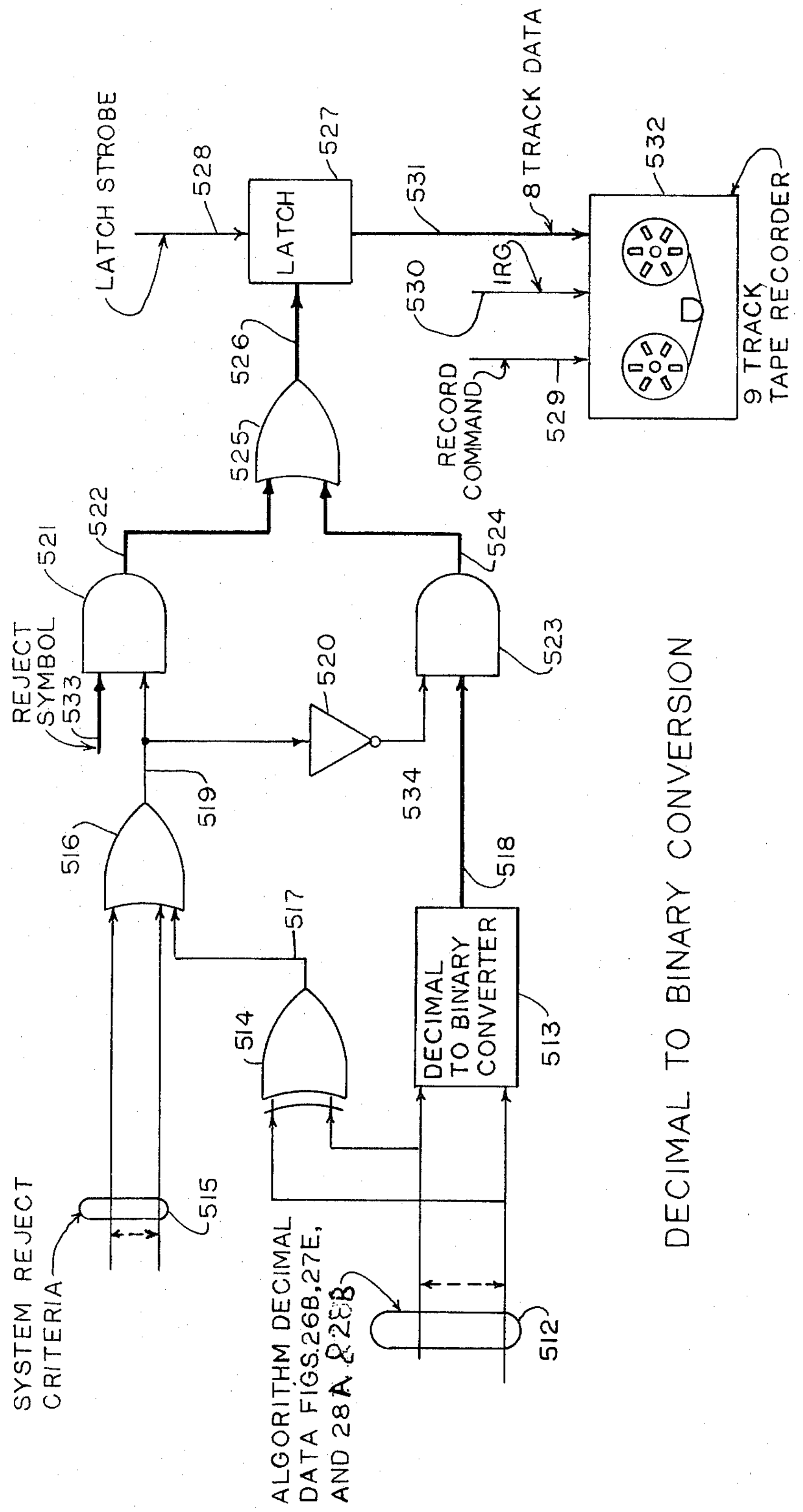

FIGS. 7*a* through 7*h* are diagrams of character intersections occurring during optical scanning of characters;

FIG. 8 is a diagram of a Count Storage circuit;

FIG. 9 is a diagram of a Stroke Sequence Processor circuit;

FIGS. 10, 11 and 12 are diagrams used in explaining how leading edges of characters are determined and interpreted;

FIG. 13 is a diagram of a Leading Edge Control and Final One Sequence circuit;

FIG. 14*a* is a diagram of a Leading Edge Processing circuit;

FIG. 14*b* is a diagram of a Final Value Processing circuit;

FIGS. 15*a* through 15f are diagrams of different characters showing zonal examples;

FIG. 16 is a diagram of a Left-Right Memory circuit;

FIG. 17*a* is a diagram of a Control Signals circuit;

FIG. 17*b* is a diagram of a Discriminator circuit;

FIG. 18 is a diagram of characters illustrating Saddle Features;

FIG. 19 is a graphic diagram illustrating Saddle Detector Modes;

FIG. 20 is a diagram of a Saddle and Numeral "1" Count circuit;

FIG. 21 is a diagram of numerals exhibiting Second Stroke Fall features;

FIG. 22 is a diagram of a Second Stroke Fall Detector circuit;

FIG. 23 is a diagram of a Blob Detector Circuit;

FIG. 24 is a diagram of numerals exhibiting Third Stroke Features;

FIG. 25 is a diagram of a Third Stroke Rise Detector circuit;

FIG. 26 is a numeral diagram exhibiting preferred and nonpreferred numeral formations;

FIG. 26*a* is a numeral diagram illustrating Two-Count Sequence numerals;

FIG. 26*b* is a diagram of a Numeral "0" Logic Circuit;

FIGS. 27*a* through 27*d* are diagrams showing different forms of numeral "1";

FIG. 27*e* is a diagram of a Numeral "1" Logic circuit;

FIG. 28*a* is a Numeral "2" Truth Table;

FIG. 28*b* is a numeral diagram showing different forms of numerals from which corresponding Truth Tables can be derived; and FIG. 29 is a diagram of a Decimal-To-Binary Conversion circuit.

Figures 1, 2:
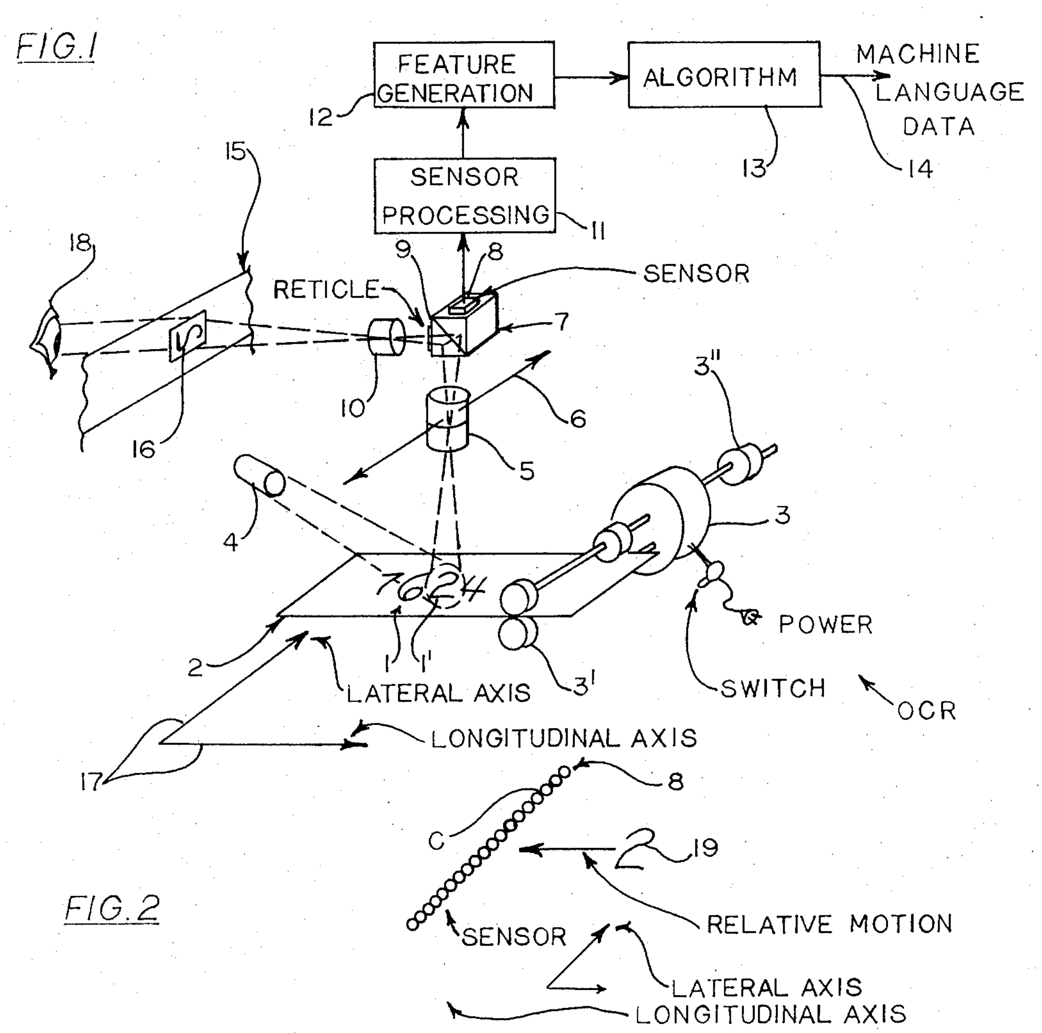
FIG. 1 is a block diagram of an optical character reader system embodying the invention.
FIG. 2 is a diagram used in explaining relative motion of a scanned character with respect to an Optical Scanning Sensor in the system.

Referring now to the drawings wherein like reference characters designate like or corresponding parts throughout, there is illustrated in FIG. 1, a block diagram of an Optical Character Reader system OCR that reads a single line of characters 1, a document 2. A single character 1', in this instance, a numeral 2 is illuminated on the document 2. A pair of axes 17 define both the longitudinal and lateral axes orientations where the document is transported in either direction along the longitudinal axis. A transport mechanism 3 propels the documents through the use of a pair of pinch rollers 3' or other means at an essentially constant speed under an optics 5 which views the character 1' illuminated by a Light Source 4.

Characters may be printed on the document 2 inverted, as mirror images or combinations thereof, depending upon the application. The OCR can be set-up to accept any such variations. The Optics 5 images Illuminated Character 1' onto a Sensor 8, which is mounted onto one surface of a Beam Splitter Cube 7 which may be replaced by half silvered mirror without affecting the theory of operation. The quadrature surface of the Beam Splitter 7 contains a rectangular Reticle 9 which is aligned with the Sensor 8.

An Optics 10 images the Reticle 9 and the reflected component of Illuminated Character 1' onto a Translucent Projection Screen 15 to form a composite Projected Image 16. When the optical axis of the Optics 10 coincides with the geometric center of the Illuminated Character 1', then the character is wholly contained within the reticle 9 as illustrated in the Image 16. If this is not the case, the character is displaced from the Reticle 9 whose position on the Screen 15 is independent of the Character 1' orientation.

The Optics 5 and 10, the Beam Splitter 7 along with the Sensor 8 and the Reticle 9 including the Light Source 4 are contained in one integral sub-assembly which is operator adjustable to move in the lateral axis direction shown as an Optics Lateral Adjustment 6. This grouping is hereafter termed "Optical Subassembly." To make this setting, the power from the Transport Mechanism 3 is removed and its manual adjustment 3'' is turned until the Reticle 9 and the character of Image 16 are aligned in the longitudinal direction. The Optics Lateral Adjustment 6 is then varied until the Reticle 9 and the character of Image 16 are coincident in the lateral direction.

The Screen 15 may be removed and the Optics 10 may be replaced by a simple Magnifying Eyepiece that an Observer 18 looks into to affect the same adjustments. A fiber optics light bundle may also be inserted between the Beam Splitter 7 and this Eyepiece so that the Eyepiece is more accessible to the operator.

If the side lying Image 16 is found to be objectionable, it may be erected using for example, a dove prism incorporated in the light path between the Beam Splitter 7 and the Screen 15. The Screen 15 is illustrated as a long narrow device where only a small portion is used at any one time. The screen length is needed to accomodate the range of lateral adjustments required for the Optics 5 while the added screen width permits the operator to acquire the target character prior to performing the manual adjustment on the Transport Mechanism 3. If the Beam Splitter 7 were rotated so that the screen length were parallel with the longitudinal axis, then this dimension could be drastically reduced. However, the screen 15 would then need to become an integral part of the Optical Sub-assembly in order to maintain the Image 16 focus as the Optics Lateral Adjustment 6 is varied.

Data from the Sensor 8 is processed by a Sensor Processer Circuit 11 which essentially amplifies sensor video, quantizes it and autocorrelates this information to reduce the effects of optical noise. This circuit block also provides an automatic gain control (AGC) action which corrects for variations in intensity of the Light Source 4, document surface reflectance and light absorptivity of the document printing. It is a requirement of Light Source 4 that it evenly illuminates the character being read. Efficiency dictates that the energy from the lamp in the Light Source 4 be wholly collected, and after proper diffusion, projected as a disc of light somewhat larger in size than the maximum sized character to be read.

A Feature Generation Circuit 12 accepts the video from the Sensor Processer circuit 11 and applies several tests to determine the absence or presence of certain specified symbol feature characteristics. This group of characteristic data is then communicated to an Algorithm 13 which applies combinatorial criteria to ascertain the identity of the symbol being read. Data 14 from the Algorithm 13 is in a machine language format such as ASCII or EBCDC which is capable of use by computer pheripheral hardware or by the computer proper.

More than one line of data can be accomodated by the configuration of FIG. 1. If such lines are always spaced by a fixed amount, then the Sensor 8 is duplicated for each line of printing. These multiple sensors are suitable spaced on the surface of the Beam Splitter 7 where the Optics 5 requires a field of view sufficiently large to encompass the numbers of lines to be processed. The Reticle 9 would only apply to a specific line number or the Reticle 9 could also be duplicated in accordance with the numbers of lines.

The Sensor Processor 11 is duplicated for each type Sensor 8 added as would systems blocks 12 and 13. However, these blocks could be set up to multiplex the data from the various sensors with a possible savings in the number of circuits. Data from each sensor channel is placed in storage and called for by the external processing computer hardware as it is utilized.

In an application where spacings on a multiple lined document are variable, then the Optical Sub-assembly must be duplicated for each line. In order to physically accomodate such an arrangement, these assemblies are staggered along the longitudinal axis, which dictates that the lines cannot be read simultaneously. However, since channel data is placed in storage, this is not a systems limitation. With sufficient spacing, the lines can be sequentially read and memory thereby eliminated.

The invention can be extended to an optical page reader application. In such an application line printing on a page will be parallel to the lateral axis while the page is moved by the Sensor 8 along the longitudinal axis. Heretofore, in single and multiple line scanning the document or medium bearing the graphic characters being scanned is moved alone. In page reading this movement is augmented by quadrature mechanical scanning. This may be accomplished by actuating the Optics 5 linearly along the lateral axis with one complete cycle per line of printing. Alternatively, it is possible to employ various optical devices to obtain quadrature scanning, such as polygon mirrors, prisms, oscillating mirrors, bimorphic crystals, etc.

The Sensor 8 of FIG. 1 consists of a large linear array of photosensitive devices C shown in FIG. 2. The axes 17 of FIG. 1 are also repeated in FIG. 2 for reference. An Image 19 (numeral 2) exhibits a relative motion to the left which is parallel to the longitudinal axis. The length of the array of the Sensor 8 is larger than the height of the Image 19 in order to allow for variations in character height and lateral position as placed there by the person filling out the document. Additionally, the added length of the Sensor 8 provides for operator errors in the setting of the Optics Lateral Adjustment 6 in FIG. 1 and general lateral tolerance errors in the Transport Mechanism 3, illustrated (FIG. 1)

The numbers of photocells required per array are also dictated by the smallest writing instrument line thickness. Typically, a minimum of two photocells are required for the least line or stroke width to be read. The writing instrument should also be restricted in maximum stroke thickness commensurate with character height and width. Small characters, with strokes that are too thick, tend to fill in their loops, as on numerals "6," "8" and "9," which can cause confusion in reading. In order to full realize the resolution potential of the numbers of elements in the Sensor 8, the Optics 5 in FIG. 1 must provide a spot size over the field of view that is significantly less than the minimum character stroke width.

As previously stated, the field that a character resides in must be evenly illuminated. An additional requirement is that the elements C in the Sensor 8 must be matched to one another in sensitivity to within ± 10 percent.

SENSOR PROCESSING

Figure 3:
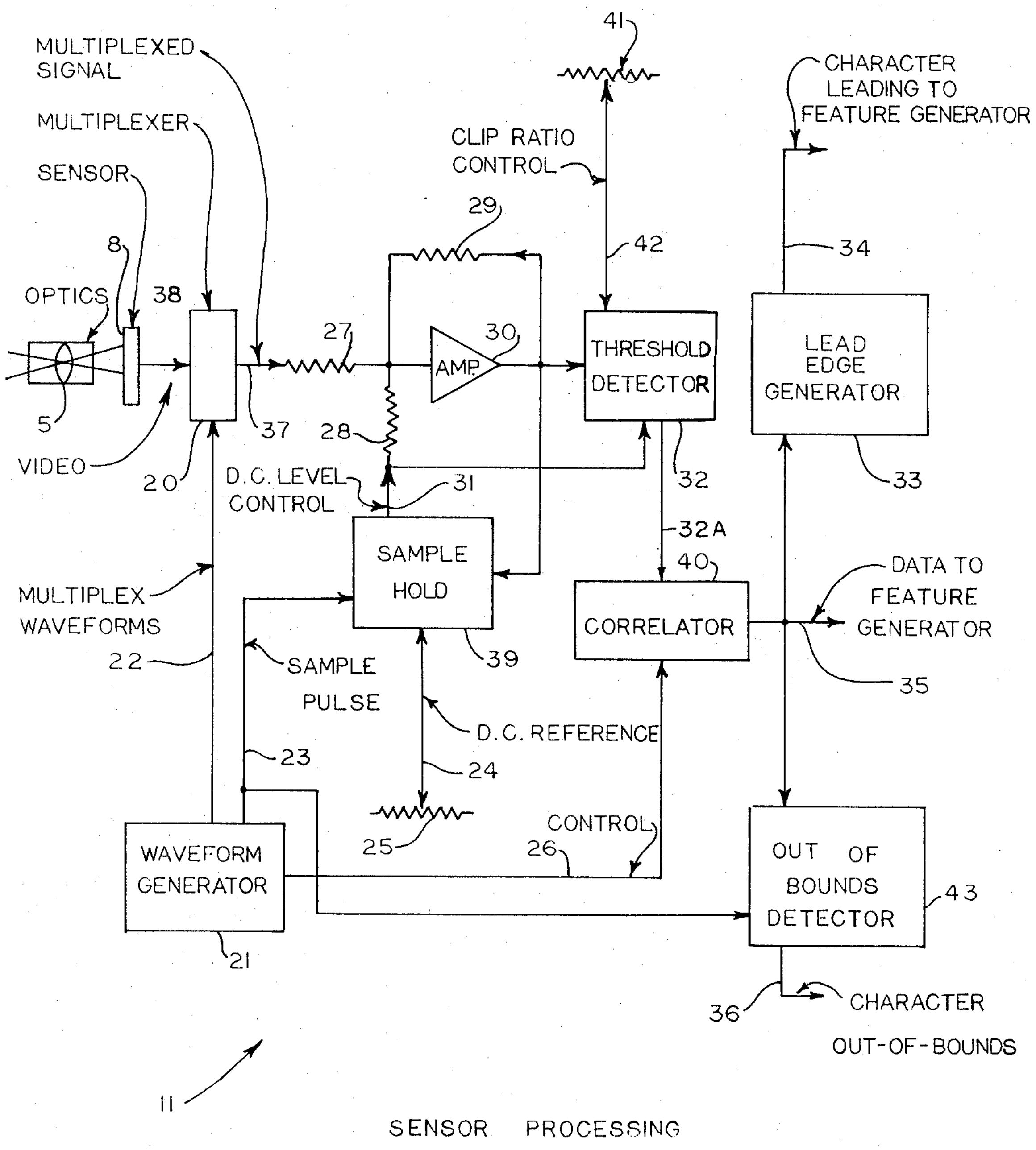
FIG. 3 is a block diagram of a Sensor Processer circuit.

FIG. 3 depicts the processing invoked on a Video 38 from the Sensor 8 prior to the application of the feature generation strategy. The Circuit Block 11 of FIG. 1 is detailed in FIG. 3.

The Optics 5 is shown to project the character image onto the Sensor 8 whose elements generate the Video 38 as that image translates. A Multiplexer 20 examines each photocell in sequence to generate a time Multiplexed Signal 37 while a Waveform Generator 21 instructs the Multiplexer 20 as to which photocell to examine in sequence at any one time. However, all photocells are interrogated for equal time periods.

The total time it takes the Multiplexer 20 to scan through all photocells in the Sensor 8 is termed "scan time" and during that interval, the document moves a finite distance beyond the Sensor 8 array. In order to provide equal longitudinal and lateral resolution in reading the document, the amount moved by the document in this interim should approximate the width of one photocell. With the document translating at a constant speed, scan time is thus defined.

The Multiplex Signal 37 is enhanced in a Feedback Amplifier 30 whose D.C. output level is controlled by a Sample-Hold circuit 39. This circuit examines the output of the Amplifier 30 during the interval when the first photocell in the Sensor 8 is being addressed by the Multiplexer 20. Data thus observed is memorized until that photocell is again investigated on the next scan. The Waveform Generator 21 instructs the Sample-Hold 39 when to update its memory.

Memorized data in the Sample-Hold circuit 39 is compared against a D.C. Reference 24 as set up on a Potentiometer 25 to establish an error signal to be fed back into the Amplifier 30 as a D.C. Level Control 31. A plurality of resistors 27,28 and 29 form an adder network to combine the outputs from the Multiplexer 20, Sample-Hold 39 and the Amplifier 30.

No character data normally exists on the first cell in the Sensor 8 and if it does, the character is subsequently rejected as being out-of-bounds. Data on the first cell is then indicative of reflected illumination for the document stock. The Amplifier 30 develops positive output signals that are essentially independent of the reflected light values when no character stroke is present. When stroke data is discerned on a cell, the output of the Amplifier 30 diminishes towards zero. How close to zero this amount becomes, is a function of the light absorptivity of the stroke, and how well that stroke masks its photodetector in question. Just as important, however, is the intensity of the overall illumination of Light Source 4 in FIG. 1.

A Threshold Detector 32 develops an Output 32A indicating stroke presence, for the photocell being examined at the moment when the output from the Amplifier 30 falls below the Detector 32 reference level. This reference level is composed of both a variable and a fixed component. The variable component is the D.C. Level Control 31 from the Sample-Hold 39 while the fixed component is a Clip-Ratio Control 42 as established by a Potentiometer 41. This latter control is set so that variations in sensitivity and local illumination on each photocell do not pass as data. The setting of a Potentiometer 41 may be raised to minimize the effects of small dirt spots, but should not be raised so high as to clip data on poorly formed character strokes.

The Variable Signal 31 provides for changes in the overall reflected light scale factor. It is essential that the Light Source 4 in FIG. 1 never be so bright as to cause the Sensor 8 and the Amplifier 30 to saturate otherwise none of these controls can be effective.

Until the present, dark characters on a light background have been considered. Light characters on a dark background can also be accomodated. The Amplifier 30 now develops a low signal for the background level and the Detector 32 picks off data rising above this level.

A Correlator 40 observes data in sequence on adjacent photocell pairs, triplets or higher order combinations. For pair correlation, first cells 1 and 2 are examined together, then 2 and 3, 3 and 4, etc. Assuming pair correlation, i.e., if two photocells in sequence initially see no data, then it is presumed that there is no information. If after a while, one photocell in a pair sees data but not the other, this anomaly is ignored as perhaps indicating a dirt spot and the absence of data is still presumed. Ultimately, two photocells in sequence see information which is interpreted as a legitimate stroke signal. Once a stroke's existence is accepted, a following condition where one photocell sees data but not the other is considered to indicate that the stroke is still present and that a void is detected.

When two cells in sequence observe no data, then the stroke is presumed ended. This process continues for the entire scan and is repeated on subsequent scans. Correlating larger numbers of photocells permits achieving greater noise immunity providing the numbers do not exceed in total width the minimum stroke width or loop width such as in numerals "6," "8" and "9." Overcorrelation then eliminates legitimate data as well as noise. Best noise immunity can be achieved with large looped characters with thick solid strokes.

The Correlator 40 has an output 35 which is further processed in the Feature Generator circuit 12 considered in the following section. The Output 35 is also processed by a Lead Edge Generator 33 which only develops an Output 34 on the leading edge of the Output Data 35. Hence if $x$ number of photocells in sequence discern data, only data from the first cell in the sequence causes the Generator 33 to generate data. The output 35 must go to zero and rise again before the generator 33 can develop a new output. The output signal 34 is also employed by the Feature Generator circuit 12. Lastly, an Out-Of-Bounds Detector 43 generates an output if the character being read resides on the first or last group of correlated photocells in a scan. The existence of such a signal instructs the OCR to reject the character as being unreadable. The Sample Pulse 23 causes the Detector 43 to observe data only during the required scan periods.

The Feature Generation Circuit 12 in the present system provides the feature information required for character recognition. In order to simplify the system as much as possible, each feature incorporated categorizes as many numerics as possible.

Figure 4:
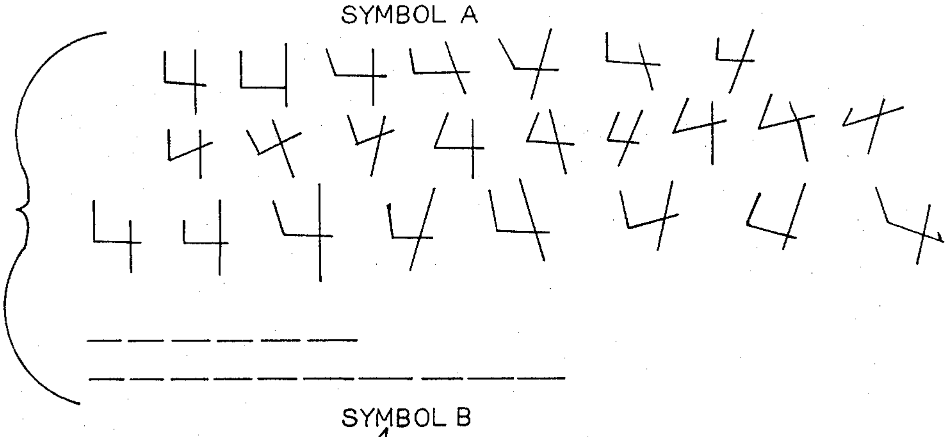
FIGS. 4, 4a and 4b are diagrams showing various configuration of numerals, used in explaining the invention.
Figure 4A:
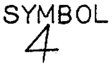
Figure 4B:
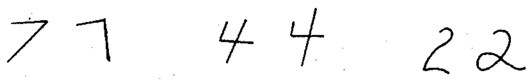

Different symbols or configurations from a feature viewpoint can represent the same numeral or character as shown by numeral pairs "7," "4" and "2" in FIG. 4*b*. All such variants are acceptable, recognizable and understandable by people. Likewise, in the present optical character reader (OCR) more than one symbol or configuration is recognizable for each character or numeral. When character features are properly chosen they survive the rigors of character distortions so that one set of features suffices for any one character. It has been possible to satisfy substantially this criteria in this system. To illustrate this insensitivity to distortion, consider that only two features are needed to identify numeral 4 in FIG. 4 for symbol type A. If one assumes that each stroke can exhibit a positive, negative, zero or infinite slope without regard to magnitudes and that the upper two strokes can be equal to or greater than one another, then it can be shown that symbol A is represented by 81 variants. Only a few of these are given in FIG. 4.

Another aspect of choosing a viable set of features is to reject questionable type characters. In business applications, it is far safer and acceptable to reject a document as OCR unreadable than to risk the misinterpretation of a symbol. The present optical character reader is capable of reading all of the carefully composed variations commonly employed by most people. The frequent mutants are rejected.

Following is a list of features examined and processed in the present system. Not all of the features go directly to the Algorithm 13. Some features, such as character height, provide information on which the system can base its judgments of the other features.

1. CHARACTER HEIGHT
2. VERTICAL COUNT SEQUENCE
3. HORIZONTAL STROKES
4. FINAL VALUE
5. VERTICAL STROKES
6. SADDLE
7. CHARACTER WIDTH
8. UPPER STROKE SLOPE
9. BLOBS - SMUDGES AND OTHER REJECTIONS
10. PRECIPITOUS FALL
11. FINAL "1" COUNT
12. THIRD STROKE SLOPE

FIGS. 5 through 26 illustrate diagrammatically the logic components of the Feature Generator Circuit 12. These components will not be explained in sequence.

CHARACTER HEIGHT

Character height is required as normalizing data for features No. 2, No. 3, No. 4, and No. 9 of the previous list. Height is measured in terms of the total number of photocells of the Sensor 8 in FIGS. 1,2 and 3 that are spanned laterally as that character traverses the sensor. By normalizing each character in height, subsequent feature information, which by definition is dimensionless, can be derived. Height data also permits undersized characters to be rejected on the basis of the danger of reading filled-in numeral loops or extraneous marks with such dwarfed entities. Character lateral position is also noncompatible with the feature recognition philosophy but each feature processing circuit takes out this variable.

HEIGHT AND END OF CHARACTER GENERATOR

Figure 5:
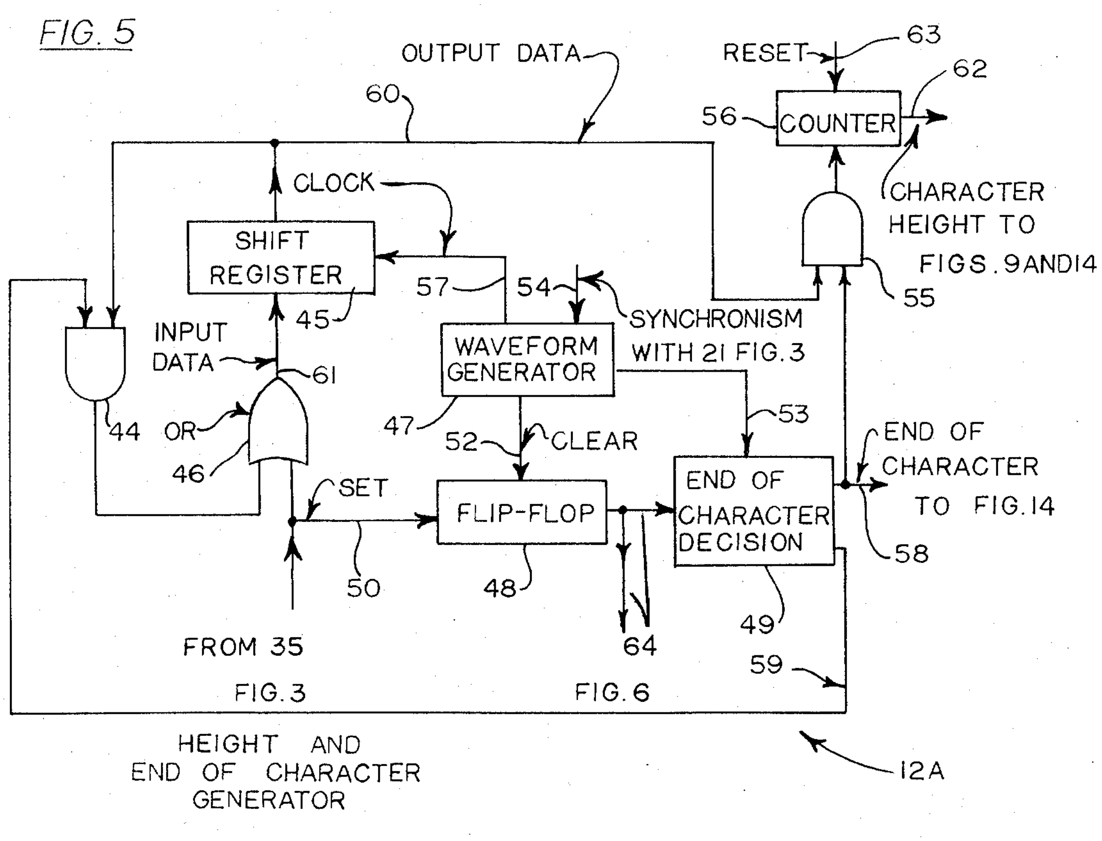
FIG. 5 is a diagram of a Height and End of Character Generator circuit.

FIG. 5 illustrates the Height and End of Character Generator 12A wherein a Flip-Flop 48 is in its "cleared" state prior to the reading of a new character. An Output 64 from the Flip-Flop 48 disables an End of Character Decision 49 so that a Gate 44 is enabled by an Output 59 from the Decision 49 while a Gate 55 is disabled by another Output 58 from the Decision 49. A Counter 56 is reset to zero count so that a Height Output 62 from the Counter 56 is also zero. A Shift Register 45, whose total bit storage capacity is precisely equal to the number of photocells in the Sensor 8 of FIG. 1, is also devoid of data.

Data derived from the line 35 of FIG. 3 drives an "OR" Gate 46 and "sets" the Flip Flop 48 for the first scan of a detected character. An Output 61 from the Gate 46 enters a Shift Register 45 which is clocked by a Signal 57 derived from a Waveform Generator 47 that, in turn, is synchronized with the Generator 21 of FIG. 3 by a Signal 54. Subsequent scan data of the character are loaded in the Register 45 while prior scan data are recirculated through the Gate 44 and added to the new data in the Gate 46. This process continues while the length of the record grows in the Register 45. At the termination of the character, a continuous series of memory elements in the Register 45 contain data which are a measure of character height. For any properly formed character, there are no voids in this information.

At the end of every scan, an Output 53 from the Waveform Generator 47 instructs the Character Decision 49 to examine the Output 64 for data. If such data exists, the Character Decision 49 maintains its prior state signifying that the character is still being scanned. After the cessation of the Output 53 from the Waveform Generator 47, a "clear" 52 from the Waveform Generator 47 clears the Flip-Flop 48 in preparation for the next scan. If on one scan, there is no data from the Correlation 40 (FIG. 3) on line 35, the Flip Flop 48 does not set and the End of Character Decision 49 disables the Gate 44 and enables the Gate 55 at the time of Output 53 from Waveform Generator 47. Data from the Shift Register 45 passes through the Gate 55 and is counted by the Counter 56 whose Output 62 denotes the character height in binary coded decimal form. The Gate 44 is disabled so that the Data 60 is not recirculated thereby clearing the Register 45 in preparation for the next character. The Counter 56 is reset through the Reset Input 63 after the character is fully processed by the rest of the system.

CHARACTER WIDTH

Knowledge of character width is not required for normalization as was height, since the features chosen are insensitive to width changes. A circuit is needed to reject characters that are undersized in width for the same reason that undersized height ciphers are rejected. Excessive width is also cause for rejection as it is indicative to two characters running into each other. The width circuit also provides other measurements, to features No. 8 and No. 11 of the previous list. Width is measured in terms of the total number of scans enveloping the character's longitudinal extremities as it traverses the sensor.

Figure 6:
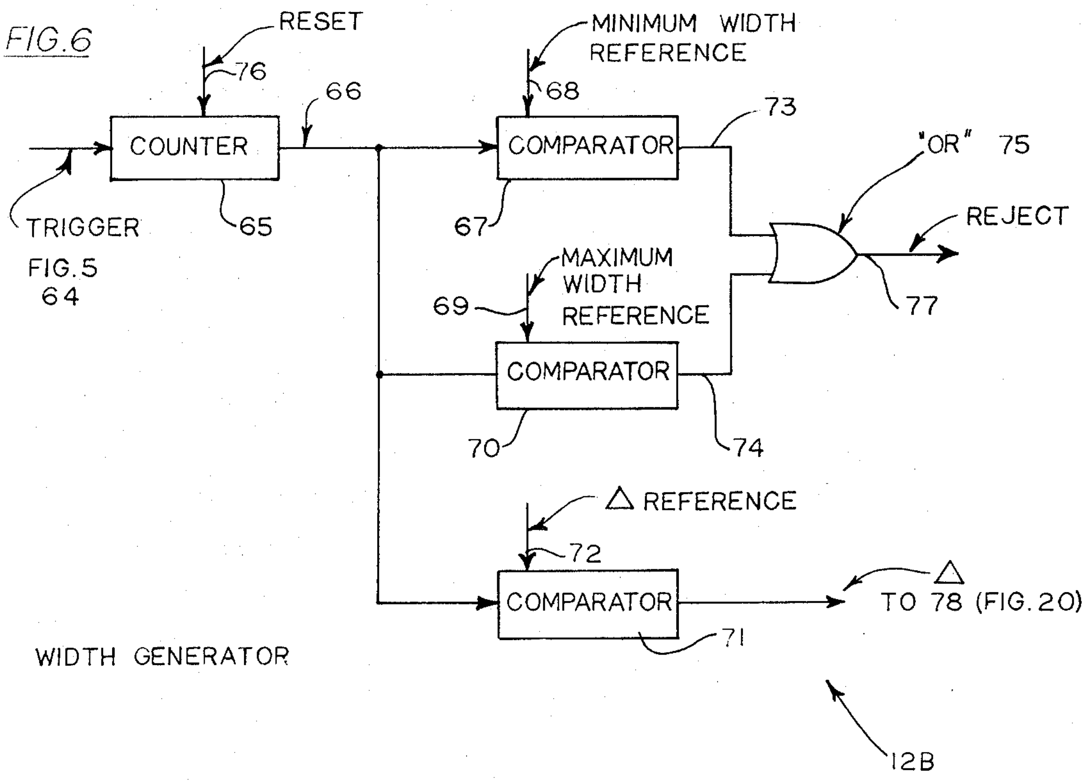
FIG. 6 is a diagram of a Width Generator circuit.

FIG. 6 shows the Width Generator 12B wherein the Output 64 from the Flip-Flop 48 of FIG. 5 triggers a Counter 65 of FIG. 6 every time the Flip-Flop 48 clears at the end of a scan. The Counter 65 then accumulates the total number of active scans indicative of character width. An Output 66 from the Counter 65 provides one input for each of three Digital Comparators 67,70 and 71. The Comparator 67 has a fixed Reference 68 and develops an Output 73 when the number in the Counter 65 is less than this Reference. The Output 73 of the Comparator 67 is zero for a character equal to or greater than the arbitrarily assigned minimum width.

The Comparator 70 has a Reference 69 and develops an Output 74 when the number in the Counter 65 is greater than the Reference 69. For properly widthed characters the Output 74 is zero. The Outputs 73 and 74 are combined in an "Or" Gate 75 to develop a composite Output 77. If the Output 77 is positive, the character is rejected as either being too narrow or too wide.

The Comparator 71 has a Δ Reference 72 and generates a momentary Output 78 when the number in the Counter 65 equals the Reference 72 as the Counter 65 increases its data magnitude. The Signal 78 is used later to examine a character after the first few scans to determine the tendency of a top horizontal stroke slope.

VERTICAL COUNT SEQUENCE

FIGS. 7*a* through 7*h* show graphically character intersections examined for vertical count sequence. Each active photocell C contained in the Sensor 8 in FIGS. 1, 2 or 3 may detect one or more of a character's strokes as that image longitudinally traverses the cell. A stroke is defined as the initial change of data away from the background, whether light or dark, and thus is independent of the longitudinal length of said data. Information on a photocell must revert to background level again before a subsequent change can be recognized as the onset of another stroke. Observe a cell $C_K$ in FIG. 7*a* as it crosses an essentially horizontal member of a numeral 3 where only the intersection "*x*" is of interest. As a second example, consider the cell $C_K$ in FIG. 7*b* crossing a laterally oriented segment of a wide stroked numeral 3. The intersection "*x*" is incurred at the leading edge of that stroke.

The number of times each photocell in Sensor 8 detects strokes is memorized in identical parallel shift registers whose bit capacities equal that of the number of photocells in the Sensor 8. These parallel registers then contain in a binary coded format the stroke count for all photocells in the array. Simply formed numerals will demonstrate up to a maximum of three strokes per photocell as shown in a numeral 6 in the FIG. 7*c* for the cell $C_K$. Simply written alphabet characters display up to a maximum of four strokes per photocell as exemplified by a Letter "W" in the FIG. 7*d*. Excessive stroke count may then be cause to reject a character.

For the reading of numerals only, a three stroke count can be interpreted as a two stroke count which simplifies the system Algorithm 13 without compromising reading accuracy. Stroke count per photocell is further processed into stroke sequence before being presented to the Algorithm as a feature.

If a number of adjacent photocells C incur the same count and the group of photocells is greater in number than a certain percentage of the number of photocells contained in a character height, then a sequence is so defined. For handwritten numerals the percentage is set, but not limited to greater than 25 percent of character height for a one count sequence. For two or three count sequences, the percentage is set at greater than 12.5 percent of character height.

Figure 7A:
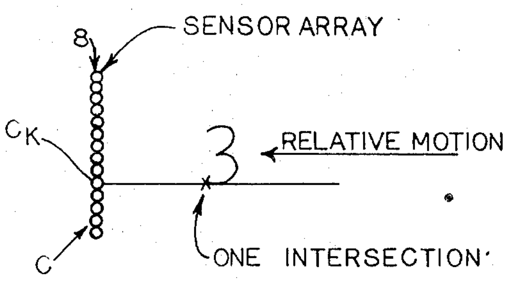
Figure 7B:
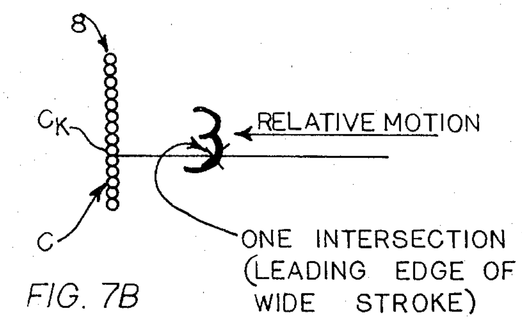
Figures 7C, 7D:
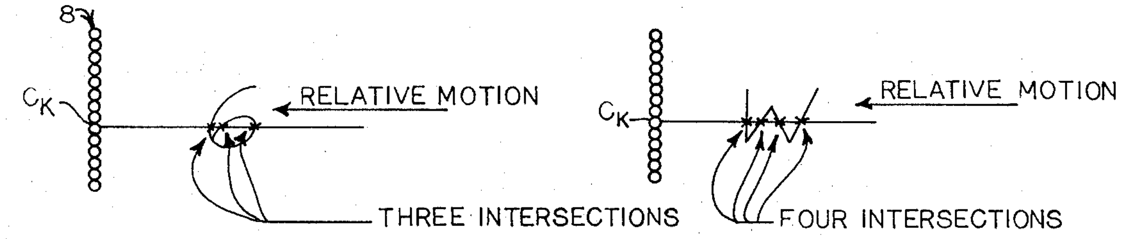
Figure 7E:
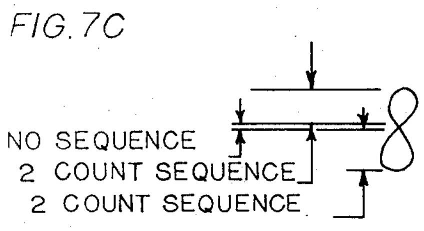
Figure 7F:
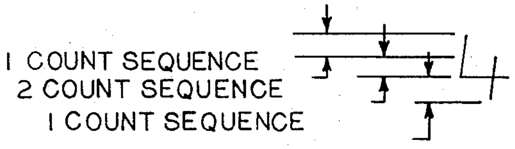
Figure 7G:
Figure 7H:

If a two-three count sequence is in progress, a short reversion to a one count train that goes back to a two-three count sequence without meeting the minimum percentage requirement, is defined as a dual two count sequence. Typically numeral 8 shown in the FIG. 7i e portrays this concept. Numeral 4 of FIG. 7*f* illustrates a one sequence followed by a two then another one. A poorly formed looped numeral, where the loop is almost filled-in as the result of a very blunt writing instrument, could develop two counts but no in sufficient quantity to establish a two count sequence as numeral 9 in FIG. 7*g*. An incomplete two sequence can be cause for character rejection but not in all cases as exemplified by numeral 2 in FIG. 7*h* which is quite readable in spite of the nearly obliterated loop. The Blob Detector of FIG. 23 is set-up to detect thick stroked writing instruments as that causing the aberration of FIG. 7*g*.

COUNT STORAGE

FIG. 8 shows the logic of count storage 12*c*. Here there are four shift registers 80,81,82 and 87 all clocked by a timing clock 85 in synchronism with the scanning of the Sensor 8 of FIGS. 1,2 and 3. All the registers 80,81,82 and 87 are identical in bit capacity which is equal to the number of photocells in the Sensor 8.

Data 35 from FIG. 3 drives one leg of an "And" Gate 88 and the Shift Register 87 whose Output 87A is flopped over by an Inverter 89 whose output 91 in turn drives the second leg of the Gate 88. Initially nothing is in the Register 87 so that the output 91 is positive by virtue of the inversion action of the inverter 89. The first data on 35 to arrive for the photocell $C_K$ (a typical element) passes the Gate 88 to become a Signal 90 at the instant cell $C_K$ is scanned in FIG. 3. This data is now in the Register 87 but delayed exactly one scan interval.

If data from the Cell $C_K$ is present on the next scan, it is negated by its stored inverted and delayed counterpart on the previous scan. If the output of the Cell $C_K$ goes to zero, the Shift Register 87 empties and the Gate 88 is now receptive to new data from the Cell $C_K$. The Register 87, the Inverter 89 and the Gate 88 form a correlation circuit which only pass stroke leading edges in conformance with the requirements of Vertical Count Sequence.

The Data 90 enters an Input $B_0$ of a Half Adder 79 whose Sum Output $S_0$ provides data for the Register 80. The output from the Register 80 is also an Input $A_0$ for the Adder 79 while a Carry Output $C_0$ from the Adder 79 is an Input $B_1$ for a Half Adder 83. A Sum Output $S_1$ of the Adder 83 drives the Register 81 which in turn provides an Input $A_1$ for the Adder 83. A Carry $C_1$ of the Adder 83 is also an Input $B_2$ of a Half Adder 84 whose Sum $S_2$ drives the Register 82. The output from the Register 82 is also an Input $A_2$ for the Adder 84.

In effect, as new data 35 enters, it is filtered to extract only leading edge information which is then counted and dynamically stored as to count in a binary coded format in the Registers 80, 81 and 82. The three Registers permit a count of up to seven strokes per photocell to be stored. For a numeral reader, the Register 82 and the Adder 84 are not required while carry $C_1$ could be a cause for character rejection as indicative of counts in excess of three.

The Registers 80, 81 and 82 are cleared after a symbol is processed by opening up the Outputs $A_o$, $A_1$ and $A_2$ for one scan duration. For purposes of brevity, this is not indicated in FIG. 8. An Output 86 from the Shift Registers 80, 81 and 82 drives the Stroke Sequence Processor of FIG. 9.

STROKE SEQUENCE PROCESSOR

FIG. 9 shows the logic of the Stroke Sequence Processor 12D where a numeric reading application is assumed and only lines $2^0$ and $2^1$ of the output 86 are utilized from FIG. 8. An Inverter 92 along with an "And" Gate 93 disable a $2^0$ signal on a Line 86 which provides an Input 95 to an Electronic Switch 94. A $2^1$ signal on a Line 102 provides a second input to the Switch 94. Effectively, the gating action of the gate 93 makes all three count sequences appear as two count sequences while one and two counts remain as before. Four or more counts are a cause for a numeral reject.

The Line 102 and its complement 108 provide the inputs for a J-K Flip-Flop 107 which is clocked by a Clock Signal 106 that is delayed in time from the Clock Signal 85 of FIG. 8. The falling edge of the signal 106 causes the Flip-Flop 107 to assume the state of its complementary inputs. Assume that a Line 95 is binary one while a Line 102 is binary zero denoting a one count. After the Clock signal 106 time, a Control Output signal 101 from the Flip-Flop 107 causes the Electronic Switch 94 to route the Input 95 to an Output 96 to trigger a Counter 110. The Line 102 is also routed by the switch 94 to an Output 97 which drives a reset input of the Counter 110. Both of the Outputs 96 and 97 are strobed by a Clock Signal 109 driving the Switch 94 so that this data is presented to the Counter 110 after the Clock Signal 85 in FIG. 8 but prior to the Clock Signal 106 in FIG. 9. Since there is only trigger data and no reset data, the Counter 110 proceeds to sum the successive one counts.

An Output 98 from the Counter 110 is compared in a Comparator 99 against a percentage of a Character Height Data Signal **99*a* derived from an Electronic Switch 103. This latter device, by virtue of the Control Signal 101, accepts one fourth of the Character Height Data that is incoming on the Line 62 from FIG. 5. This percentage of total height is simply effected by discarding the least two significant bits of the Input 62. When the Output 98 from the Counter 110 exceeds that of the Character Height Data Signal 99*a*, an Output 100 from a Comparator 99 changes state to clock a Shift Register 105 which accepts as Data the Control Signal 101. It does not matter if the counter continues to run on the one sequence since the Register 105** only clocks once.

Prior to reading a character, the Register 105 is initially loaded with a binary one in its first stage as a framing bit. A single one count sequence is loaded after that as a binary zero with the binary one notation reserved for a two count sequence. The one and two sequence formats can of course be interchanged. An Output 104 from the Register 105 is routed to the Algorithm 13 to indicate the count sequences.

Assume now that a two count is detected. Line $2^1$ is energized which causes the Counter 110 to reset in synchronism with the Clock Signal 109. There is no signal on the Line 96. Shortly after the Clock Signal 109 terminates, the Flip-Flop 107 changes state to cause the Switch 94 to route the signal on the line 102 to the trigger Input 96 of the Counter 110. Similarly, the signal on the Line 95 is routed to the Counter Reset Line 97.

The Counter 110 now sums the two-count pulse train but the Electronic Switch 103 selects one-eighth of character height for reference by virtue of the change of the state of the signal on the Control Line 101. This character height percentage is achieved by discarding the least three significant bits from the Signal 62 from the Counter 56 of FIG. 5. When the signal 98 exceeds the signal **99*a*, the Comparator 99 generates the Output 100 to clock the Register 105 that accepts that data complement on Line 101** that was used for the one sequence.

For short sequences, the Counter 110 resets before it has a chance to exceed the Reference **99*a* so that the Register 105 does not record such truncated data. With the arrangement of FIG. 9,** count sequences do not have to alternate but can be registered in any combination i.e., one-two-one sequence, a two-two sequence or a one-two-two sequence etc.

HORIZONTAL STROKES — FINAL ONE COUNT AND FINAL VALUE

Evaluation of horizontal strokes is determined as illustrated graphically in FIG. 10 and the Leading Edge Examples of FIGS. 11 and 12. In FIG. 3, an Output 34 is generated that is only present on horizontal stroke leading edges. Such information is in space quadrature to the kind of data produced in Vertical Count Sequence. For simply formed numerals, a maximum of four horizontal strokes can be incurred and these are typically limited to, but not incumbent upon, numerals 3 and 8 to generate. The feature data developed here accepts the information derived from one scan, selected according to a criteria to be explained, and identifies where in the character's height such leading edges reside.

Laterally, the character is divided into three sections; i.e., a top quarter, a middle half and a bottom quarter. See FIG. 10 where Numeral 3 serves to illustrate this concept. A single leading edge residing in the top quarter is defined as $S_1$ while a single edge in the middle half is defined as $S_2$. Lastly, a single edge in the bottom quarter becomes $S_3$. The selected scan never goes through a four count region as indicated in FIG. 10.

Not all characters have three leading edges in a selected scan, for some have two and others only one. A Numeral 9, as in FIG. 11 may have two or three edges depending upon how it is formed. For distorted characters, more than one edge may lie within a zone while the correct zone may be devoid of data. Observe Numeral 9 in FIG. 12 where edges $X_1$ and $X_2$ lie in the middle half zone while $X_1$ should have fallen in the top quarter.

Based upon studies of handwritten numerals, the misplacement of edges is corrected according to an empirical formula. The Following table shows all zonal combinations up to a maximum of three leading edges. The first seven rows denote well formed characters while the remaining rows denote interpretations of distortions.

LEADING EDGE INTERPRETATION TABLE

| EDGES TOP QUARTER | EDGES MIDDLE HALF | EDGES BOTTOM QUARTER | INTERPRETATION |
|---|---|---|---|
| 1 | 0 | 0 | $S_1 \cdot \overline{S_2} \cdot \overline{S_3}$ |
| 0 | 1 | 0 | $\overline{S_1} \cdot S_2 \cdot \overline{S_3}$ |
| 0 | 0 | 1 | $\overline{S_1} \cdot \overline{S_2} \cdot S_3$ |
| 1 | 1 | 0 | $S_1 \cdot S_2 \cdot \overline{S_3}$ |
| 1 | 0 | 1 | $S_1 \cdot \overline{S_2} \cdot S_3$ |
| 0 | 1 | 1 | $\overline{S_1} \cdot S_2 \cdot S_3$ |
| 1 | 1 | 1 | $S_1 \cdot S_2 \cdot \overline{S_3}$ |
| 2 | 0 | 0 | $S_1 \cdot S_2 \cdot S_3$ |
| 0 | 2 | 0 | $S_1 \cdot S_2 \cdot S_3$ |
| 0 | 0 | 2 | $S_1 \cdot S_2 \cdot S_3$ |
| 1 | 2 | 0 | $S_1 \cdot S_2 \cdot S_3$ |
| 0 | 1 | 2 | $S_1 \cdot S_2 \cdot S_3$ |
| 0 | 2 | 1 | $S_1 \cdot S_2 \cdot S_3$ |
| 1 | 0 | 2 | $S_1 \cdot S_2 \cdot S_3$ |
| 2 | 1 | 0 | $S_1 \cdot S_2 \cdot S_3$ |
| 2 | 0 | 1 | $S_1 \cdot S_2 \cdot S_3$ |
| 3 | 0 | 0 | $S_1 \cdot S_2 \cdot S_3$ |
| 0 | 3 | 0 | $S_1 \cdot S_2 \cdot S_3$ |
| 0 | 0 | 3 | $S_1 \cdot S_2 \cdot S_3$ |

Location of the selected scan is accomplished by a searching technique where a circuit memorizes data on the first active character scan and only updates this information providing a higher number of leading edges have been discerned and that this number is three or less. Scans disclosing the same number of edges as already in memory are ignored. A maximum of two updates can be incurred if a single edge is initially detected. In order to effect the decision process to determine whether or not to use data or discard it, a full scan must be incurred. Data on this scan is stored in a shift register whose capacity is precisely equal to the number of photocells in the Sensor 8 of FIGS. 1, 2 and 3. If indicated, the data is sent on for further processing or otherwise it is discarded. The horizontal stroke combinations go to the Algorithm 13 and also permit the Control Signals Circuit of FIG. 17*a* to derive its singular data.

Another feature closely allied with the derivation of the Horizontal Strokes is the Final One Count Character Singularity. This data is useful for reconciling differences in distortions between certain forms of Numerals 3 and 5.

LEADING EDGE CONTROL AND FINAL ONE SEQUENCE COUNTER

FIG. 13 shows the Leading Edge Control and Final One Sequence Counter logic which accumulates the number of single leading edges in a Final One Sequence Counter 130 whose output is compared against a fixed reference 132. If at any time, a two or three count is detected, the counter 130 is reset to zero. If the counter 130 exceeds the reference, and there are only single edge counts on the final scans, then a final one count feature is said to exist.

A last allied feature to be determined concerns what sector (top quarter, middle half or bottom quarter) the Final Value of a character resides in. This feature has the ability to resolve certain uncommon character anomalies. In particular, only characters with a final count of unity are tested for their Final Values. Because of the Final One Count, this Final Value Feature is capable of sharing some of the Final One Count Feature circuit just described.

Data 34 from FIG. 3 enters on a line 138 in FIG. 13 where a maximum of four pulses per legitimate numeral for each scan are incurred. The data from the first scan passes through an "And" Gate 114 thereby developing trigger data on a line 137 for a Counter 115 and this data is also stored in a Register 111. At the end of the scan, the Counter 115 retains a record of the number of pulses incurred during that scan and this information is presented on a Line 118 to a Comparator 120 and a Latch 117. The Comparator 120 receives as its second input the output from the Latch 117 on a Line 119 and develops an output on a line 121 when the data from the Counter 115 exceeds the data from the Latch 117 which in turn enables an "And" Gate 135.

The Output on the line 118 from the Counter 115 is in addition examined for a four count by a Decoder 126 whose Output on the line 136, if a four count is discovered, inhibits the "And" Gate 114 to preclude the acceptance of further data for that scan. The Signal on the line 136 also inhibits the "And" Gate 135 thereby preventing the setting of a Flip-Flop 124 via a Line 123 during the End-Of-Scan Strobe signal on a plurality of lines 122.

Assume that on the first scan, the Counter 115 accumulates a single count. At the end of that scan, the Latch 117 is strobed by a signal on the line 123, so that the latch 117 also assumes a unity count and the Flip-Flop 124 is set by the same pulse to enable a Gate 112 through a Line 125. Leading edge data, stored in the Shift Register 111, then clocks out on the second scan through the Gate 112 to FIG. 14*a* as Output 113. The Register 111 in turn stores data on the second scan which may be communicated to FIG. 14 on scan three depending upon whether or not the leading edge count exceeds the previous count of unity. The Clock Signal 85 to the Register 111 is in synchronism with the data from the Sensor 8 in FIGS. 1, 2, and 3. The Counter 115 is reset at the end of each scan by an End of Scan Reset Signal on line 116 which in time sequence is delayed from the Strobe signal on the lines 122. The Flip-Flop 124 is cleared by an End of Scan Clear signal on the line 139 so that the output from the Flip-Flop 124 is a rectangular waveform approximately equal in width to one scan interval. The Clear Signal 139 occurs in time sequence prior to the Strobe signal in the lines 122 otherwise the Flip-Flop 124 would clear shortly after it is set.

After a finite number of scans, assume that two leading edges in a sequence are disclosed on the nth scan. In an identical manner to that previously described, the Flip-Flop 124 sets to permit the nth scan data in the Register 111 to propagate to FIG. 14 on the ($n$+1) scan. This process continues up to a maximum of three counts and must ignore a four count. Any repeated or lower order counts than that stored in the Latch 117 are always bypassed as irrelevant.

A One Count Decoder 127 examines the output from the Counter 115 at the end of each scan. This process is achieved through the action of an "And" Gate 140 also pulsed by the End-Of-Scan Strobe signal 122 to develop an output Signal on the line 141. If a unity count exists, an Output on a line 128 of the Decoder 127 triggers the Final One Sequence Counter 130 while a non-unity count (other than zero) resets the Counter 130 through a Line 129. Only if a numeral contains one counts in the final extremities does the Counter 130 retain any data as that character departs the sensor. Accumulated data in the Counter 130 is directed to a Comparator 133 on a Line 131. The Comparator 133 has a fixed Reference denoted as 132 and develops an Output 134 if the Counter 130 data exceeds the Reference 132 data. Although this condition can occur at any time the character is being scanned, it is only significant if retained at the character's end.

The final one count sequence is then communicated to the Algorithm 13 on a Line 134. It is important to realize the difference between the Data on the line 134 in FIG. 13 and the Data on the line 104 in FIG. 9. The latter represents count sequence of one, two or three counts as the character is examined by the circuit processing in a lateral direction. The former data signifies the presence of a single final count sequence as the character is examined by the circuit processing in the longitudinal direction. By judicious choice of circuit processing techniques, data from the single linear array of the Sensor 8 of FIGS. 1, 2 and 3, can be examined for its dual axis characteristics typical implementations of which have just been illustrated.

The Output on the line 128 from the Decoder 127 is also communicated to FIG. 14*b* for use in determining the Final Value of Characters with a final one count. This sharing of the Decoder 127 conserves hardware.

LEADING EDGE PROCESSING

FIG. 14a shows the logic for the Leading Edge Processing wherein the Edge Data 113 as derived in FIG. 13, enters on a line 142 of FIG. 14a to drive one leg of an "Or" Gate 144 whose output is on a Line 149. This output provides the input data for a Shift Register 145 whose bit storage capacity is equal to the number of photocells in the Sensor 8 of FIGS. 1, 2 and 3. The Register 145 is clocked by the Signal 85 in synchronism with the Sensor 8 scanning rate and has an output on a Line 150.

The Output Data on the line 150 is normally recirculated through an "And" Gate 146 whose Output on a line 148 provides the second input for the "Or" Gate 144. The "And" Gate 146 is normally enabled by a signal on a line 143 derived from the Update Control 125 of FIG. 13. When new data is provided on the line 113, of FIG. 13 the "And" Gate 146 is disabled, to "dump" the old data, for one scan period, after which time it is enabled once again to permit recirculation to retain the new data. This updating is only permitted up to a maximum of twice per character, not including the initial loading.

The memory in the Register 145 is also "dumped" by an End of Character Clear one the line 147 after the symbol has been identified by the Algorithm 13 and recorded. The Output 150 from the Register 145 also drives one leg of an "And" Gate 164. A Gate 152 samples a Total Data Signal 174 on a line 173 after the character has been fully analyzed by the Sensor 8. This sampling is effected by the Signal 58 from FIG. 5 appearing on a line 151 of FIG. 14*a*. As will be recalled, the Signal 58 is a rectangular waveform which is one scan interval in duration and is initiated when it has been determined that the character has completely passed the sensor but is not yet recorded. The Total Data 174 is derived from a Memory in FIG. 16 and represents the total of all data that emanates from the Sensor 8 during the analysis of a character. The first pulse from that data is an indication of either the extreme top or bottom (as the system is designed) of that character.

The initial pulse on the line 173 sets a Flip-Flop 154 via the Gate 152 and an output Line 153. The output 155 of the Flip-Flop 154 enables a Gate 172 to admit a Clock Signal 85 which triggers a Counter 157 via a Line 156. The Output 159 of the Counter 157 is compared for equality in a Comparator 158 against a One Fourth Of Character Height 161 derived from 62 of FIG. 5. This partial height reference is evolved by dropping the least two significant bits of the Height Data. When an equality is realized, the Comparator 158 develops an Output 160 to reset the Counter 157 to zero count which permits this process to continue over again.

Four pulses for each character are thus generated which are in synchronism with the start of the character and occur at intervals of one quarter character height. These pulses index a Shift Register 162 whose Output 163 causes a Gate 164 to select the appropriate signal from the line 150 and route the signal to the 3 Counters 166 via the line 165. A gate and a counter identical to 164 and 166 respectively is permanently assigned to record the number of pulse contained in each character zone illustrated in FIG. 10. The Signal 163 is also routed to FIG. 14*b* to aid in the Final Value Processing.

The End of Character Clear 147 also resets all of the Counters 166 and the Flip-Flop 154. A Counter Output 167 from each of the Counters 166 provides the data for a Leading Edge Interpreter 168 which implements the Leading Edge Interpretation Table to generate data 169 for the Algorithm 13, and for use by a Left-Right Memory in FIG. 16. The details of the Leading Edge Interpreter 168 are not described here since they are realized with straightforward "AND" Gate logic design.

A Gate 175 is enabled by the Shift Register 162 only during that scan time coincident with the character's lateral center. Additionally, the Gate 175 is only enabled by Inhibit data from the Interpreter 168 if the Character has no Stroke $S_2$ as illustrated in FIG. 10. The Gate 175 is further strobed by the Clock 85. An Output 170 from the Gage 175 is given the designation of the Mid-Character Strobe as required for additional feature generation by the logic of FIG. 17*a*.

FIG. 14*b* shows the logic Value Processing for Final Value Processing where Data 110 on a line 494 from FIG. 13 is delayed by one scan period from the Sensor Leading Edge Data 34 of FIG. 3. This delay permits a decision to be made whether to store such information in a Register 500 of FIG. 14*b* or to discard such data. If there is only one edge in the stored information, the Output 128 from the Decoder 127 of FIG. 13 enables a Gate 495 on a Line 493 in FIG. 14*b* for one scan interval. This enabling then permits the Stored Data 110 from FIG. 13 to enter the Gate 495 through Line 494 in FIG. 14*b*.

The Gate 495 transfers this information to a Line 496 for transfer to an "OR" Gate 497. The Output data from Gate 497 to a line 499 then loads into a Shift Register 500 which is clocked in synchronism with the Sensor 8 by the Clock 85. The Register 500 is identical in bit length to the number of Sensor photocells 8.

When the Line 493 is high, it is inverted by a Inverter 505 to disable a Gate 502 on a Line 504. In this manner, prior data in the Register 500 is prevented from recirculating when new data replaces it on the Line 499. It will be recalled that the Line 493 is only high for a one count in a scan.

For other than a one count, data in the Register 500 recirculates and no new signal is loaded in. In this manner, after a character is fully scanned, the Register 500 contains a single bit of information signifying the Final Character Value, if single valued. Register information is erased by the End of Character Clear on a line 503 which inhibits the recirculating Gate 502.

After the character is fully scanned, the Zone Selection 163 from FIG. 14A energizes the three Gates 507 in sequence. A signal on a line 501 then passes one of the three Gates 507 on multiple Output lines 508. Depending upon which of the three Lines 508 is excited, sets one of three Flip-Flops 509. Multiple Outputs 511 from the Flip-Flops 509 then communicate to the Algorithm 13 in which zone, illustrated in FIG. 10, the Final Value resides.

Once the character is determined and recorded, the End of Character Clear on the Line 503 clears the Flip-Flops 509 is preparation for the next character.

VERTICAL STROKES

Vertical Stroke Feature generation is accomplished by first dividing the character scanned in the longitudinal direction into left and right sections and storing all data thus partitioned in two Memories illustrated in FIG. 16 and denoted as Shift Registers 182 and 192. The Leading Edge Control which searches for the scan providing the maximum number of acceptable leading edges is described under Leading Edge Control and Final One Sequence and is also utilized as the criteria for determining where a character is to be divided. Depending upon how a numeral is drawn determines where this sectioning takes place which may be at any point along the longitudinal cipher axis.

For simplicity, the Memories 182 and 192 of FIG. 16 are termed Left and Right where the Left Memory stores data on and to the left of the division and the Right Memory data to the division right. The first scan's data from output 35 of FIG. 3 is always loaded into the Left Memory which is continuously circulating. If the second and subsequent scans do not disclose counts exceeding the first scan count, data evolved from these latter scans are loaded on top of one another in the Right Memory which also is continuously recirculating. If ever a higher leading edge count is discerned, all data from the Right Memory is transferred to add to that already in the Left Memory and the Right Memory is emptied. This transference interval is one scan period in duration. New data incurred at the end of this process, whose leading edge count does not exceed the previous count, is loaded into the Right Memory. Transference of information may occur a maximum of one more time after the first procedure.

The data retained in both Memories, once the character is completely analyzed by the Sensor 8, is now in the desired partitioned form. Each Memory is next examined for any break in lateral continuity of information between Strokes $S_1$ and $S_2$ and Strokes $S_2$ and $S_3$ as protrayed in FIGS. 10, 11 and 12. Such breaks are interpreted as indicating the absence of any of the strokes $S_4$, $S_5$, $S_6$ or $S_7$ as illustrated in FIGS. 15*a* through 15f. If less than three leading edge counts are detected in the entire analysis of a character, then one or two of Strokes $S_1$, $S_2$ or $S_3$ are not present. In order to effect the derivations of Strokes $S_4$, $S_5$, $S_6$ and $S_7$, substitutions are made for any missing Stroke $S_1$, $S_2$ or $S_3$. However, the absence of such information is noted by the Algorithm as a distinctive character feature.

Figure 15A:
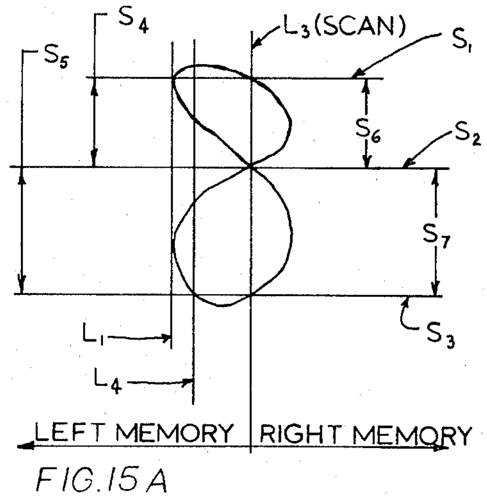
Figure 15D:
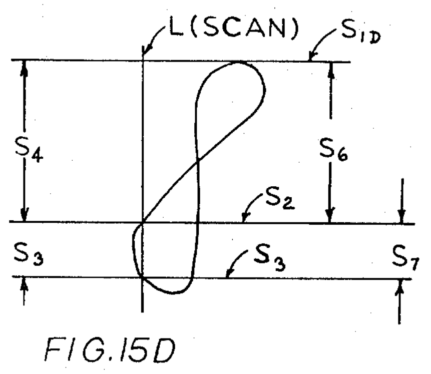
Figure 15B:
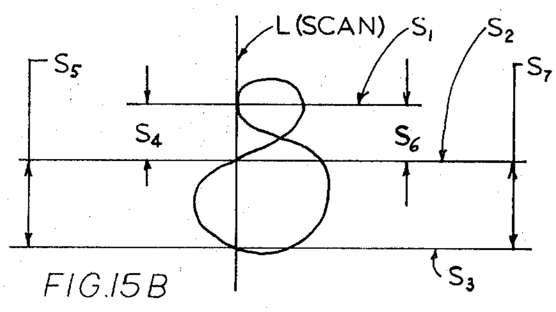
Figure 15E:
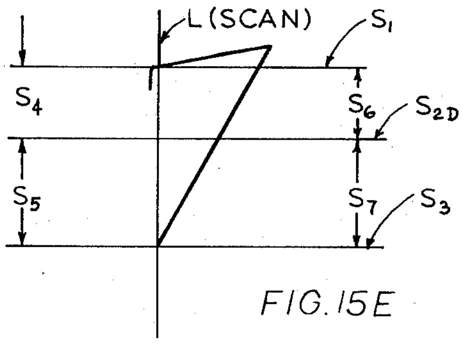
Figure 15C:
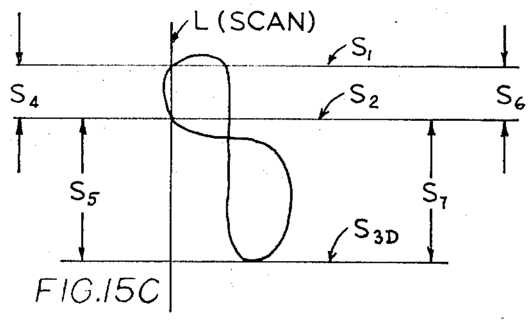
Figure 15F:
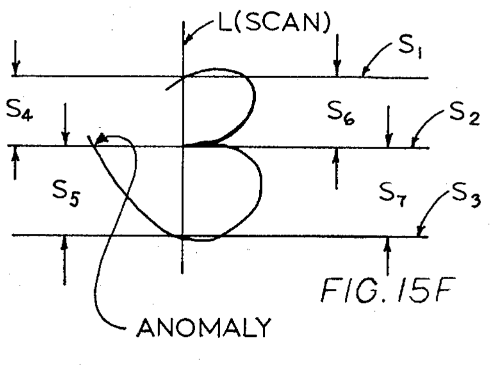

Zonal examples for numeral 8 are shown in FIGS. 15A through 15D and zonal examples for numerals 7 and 3 are shown in FIG. 15E and 15F respectively. Numeral 8 is employed in FIG. 15A through 15D to examplify four variations on what has been expounded above. Because Numeral 8 exhibits such a large number of variations, the use of Strokes $S_4$, $S_5$, $S_6$ and $S_7$ as a feature group does not represent a selective enough process for that cipher. For many characters, however, this feature is quite useful but this discussion will be expanded in explaining the Algorithm 13.

In FIG. 15A, two leading edges are initially detected on the first tangential scan noted as Scan L1. A series of four leading edges are next detected, typical of which are shown on Scan L4, and are ignored. Scan L3 depicts three leading edges that are accepted to update the two edges detected by Scan L1, and it is at this Line L3 the numeral is sectioned. Data on Scan L3 and those scans to its left are stored in the Left Memory while data, not including that in Scan L3, are stored in the Right Memory. Scan L3 intersects the Numeral in three places to define Strokes $S_1$, $S_2$ and $S_3$. For both the Left and Right Memories, data is continuous between Strokes $S_1$ and $S_2$ and Strokes $S_2$ and $S_3$ so that Strokes $S_4$, $S_5$, $S_6$ and $S_7$ are all present.

In FIG. 15B, Partition Line L intersects the Numeral Eight in three places with $S_1$ being evolved from a tangential geometry on the upper left loop. Data is continuous, except in the Left Memory between Strokes $S_1$ and $S_2$, so that Stroke $S_4$ is absent. FIG. 15C illustrates a left rotated Numeral Eight where Partition Line L only discloses Strokes $S_1$ and $S_2$—there being no three intersection scan. The bottom horizontal tangent to the Numeral is then substituted as $S_{3D}$ in place of missing Stroke $S_3$ where the subscript D denotes that substitution. This tangential point is evolved by summing the Left and Right Memories and utilizing the last or first of the composite data (depending upon the photocell multiplexing sequence) as the address of $S_{3D}$. The Numeral 8 in FIG. 15C lacks Stroke $S_5$ but contains $S_4$, $S_6$ and $S_7$.

In FIG. 15D, the Cipher is rotated clockwise so that partition Line L only discloses Strokes $S_2$ and $S_3$ with no three intersection scan incurred for that character. Using a technique similar to that employed for FIG. 15C, Substitute Stroke $S_{1D}$ is derived utilizing the upper numeral tangent. Stroke $S_4$ is missing in FIG. 15D. A numeral 8 can never miss a Stroke $S_2$ so the Numeral Seven of FIG. 15E is utilized to illustrate this condition. Partition Line L intersects this character at $S_1$ and $S_3$, since a three count is never incurred. A substitute $S_{2D}$, at a lateral midpoint in the character's makeup, is evolved as the Mid-Character Strobe 170 in FIG. 14. FIG. 15E lacks Strokes $S_4$ and $S_5$, but if the upper left hook were extended below $S_{2D}$ only Stroke $S_5$ would be missing.

FIG. 15F shows an anomaly for a Numeral Three where the bottom character segment sweeps up and to the left of Partition Line L to exceed in height Stroke $S_2$. Such an abberation would decode as the absence of Stroke $S_4$ but the presence of Stroke $S_5$ would erroneously imply a closed lower loop for that Numeral. This anomaly is circumvented by examining Output 86 of the Count Storage of FIG. 8 for every single scan in which the Shift Register 145 of FIG. 14 is updated. If more than a count of one is disclosed in any memory element at update time, then the singularity is present. Anomaly data is communicated to the Discriminator of FIG. 17B where that circuit is instructed to assume the absence of strokes $S_4$ and $S_5$ regardless of other information.

For well proportioned Characters, Strokes $S_1$, $S_2$ and $S_3$ are virtually coincident with Strokes $S_{1D}$, $S_{2D}$ and $S_{3D}$ so that either grouping may be employed to derive data on $S_4$, $S_5$, $S_6$ and $S_7$. The procedure just described, however, is an optimum one for taking into consideration typical abberations incurred in reading handwritten characters.

LEFT-RIGHT MEMORY

Left and Right Memory Shift Registers 182 and 192 and Delay Shift Register 199 of FIG. 16 have bit storage capacities identical in length to the number of photocells in the Sensor 8. These Registers are also indexed by Clock 85 in synchronism with the Sensor multiplexing. Prior to a Character's arrival, all the Registers are empty and the Memory Control 125 from FIG. 13 drives a Line 193 to enable a pair of Gates 191 and 197. An Inverter 178 accepts the Signal from the Line 193 to generate a disabling signal on a Line 180 for another pair of Gates 188 and 190. A System Clear on a Line 179 normally enables recirculating Gates 181 and 191 but inhibits these Gates to clear both Memories after a Character has been identified and recorded. The duration of this Clear Signal is one scan period.

On the first active Character Scan, the Data 35 from FIG. 3 enters the Delay Register 199 on a Line 200 where the data from that operation is stored for one scan interval. Such storage is required to permit the Memory Control 125 of FIG. 13 time to become established in order to decide how to route the information in the Register 199 to either the Left or to the Right Memories. The Register 199 does not recirculate data as do the Registers 182 and 192. The first active scan always invokes the disabling of the Gates 191 and 197 and the enabling of the Gates 188 and 190 to conduct the stored data in the Register 199 to the Left Memory 182. This is accomplished as follows:

The Output 189 from the Delay Register 199 passes through the "And" Gate 188 to drive one of the three legs of the "Or" Gate 184 whose Output 185 in turn provides the data for the Memory 182. At this point in time, data from the first scan is in the Left Memory 182, data from the second scan is in the Register 199 while the Right Memory 192 has no data.

Assuming that the second scan discloses no leading edge count greater than that uncovered by scan one. Second Scan data in the Register 199 is conducted on scan three through the Gate 197 whose Output 198 drives one of the two legs of the "Or" Gate 195. An Output 196 from Gate 195 provides the input for the Right Memory 192. At the end of scan three, the Left Memory 182 contains data on scan one since that information recirculates through the "And" Gate 181 whose Output 183 drives the second of the three legs of the "Or" Gate 184. The Right Memory 192 contains data on scan two while Register 199 holds data on scan number three.

Still assuming leading edge counts not exceeding that incurred on scan one, data from later scans adds on top of that in the Right Memory 192 from earlier scans. Early information is retained by circulation through the "And" Gate 191 whose Output 194 drives the second leg of the "Or" Gate 195.

Scan one data is still held by the Left Memory 182 also by virtue of circulation. Assume now that on the $k^{th}$ scan a leading edge count is disclosed that exceeds that of scan one. One the $(K+1)$ scan, all data in the Right Memory 192 passes the Transfer "And" Gate 190 whose Output 187 drives the last leg of the "Or" Gate 184. The Recirculating Gate 191 is disabled which erases all of the information in the Right Memory 192. Data in the Register 199 for the $K^{th}$ scan is added to that transferred from the Memory 192. At the end of the (K+1) scan, the Memory 182 contains all data derived by the Sensor 8, except that of the (K+1) scan, while the Register 199 holds (K+1) scan data. The Right Memory 192 is completely devoid of data.

Assume that the (K+1) scan and a number of subsequent scans find no leading edge count exceeding that found in the $k^{th}$ scan. Data already in the Left Memory 182 continues to circulate while new data is routed to the Right Memory 192 where it accrues. A transference from right to left can only occur one more time if such action is called for by the character makeup. After the cipher has departed the Sensor and the Registers 182 and 192 respectively contain the left and right components of the segmented entity on respectively Lines 177 and 176.

These two Lines are also summed in an "Or" Gate 175 whose Output 174 provides information for FIG. 14 and 17. The Data 174 is unbroken from start to finish in any properly formed character. The absence of such continuity can be cause for a character reject.

VERTICAL STROKE DISCRIMINATOR

Vertical stroke discrimination consists of the combined actions of a control signals logic and a Discriminator of FIG. 17A and 17B respectively. In FIG. 17A, two signal sets are developed to control the operation of FIG. 17B. The first of these sets is a Blanking Signal 227 which activates operation between Strokes $S_1$ and $S_3$ or their substitutes. The second set identified the regions between Strokes $S_1$ and $S_2$ and Strokes $S_2$ and $S_3$ or their substitutes.

FIG. 17B accepts the dual control sets from FIG. 17A and utilizes these, to analyze for data breaks, information stored in the Left and Right Memories of FIG. 16. Any regional break so detected is stored in one of four Flip-Flops to generate information on previously defined Strokes $S_4$, $S_5$, $S_6$ and $S_7$. The Flip-Flops are initially set to denote the presence of all of these Strokes. As breaks are discovered, the appropriate Flip-Flop is cleared to denote the absence of a Stroke.

CONTROL SIGNALS

If Stroke $S_1$ is missing, the appropriate constituent of the Group Signal 169 in FIG. 14A enters a Line 202 in FIG. 17A and is inverted by an Inverter 203 to develop an Output 204 thereby activating a Gate 205. The Total Memory 174 from FIG. 16 provides the other input for the Gate 205 on a Line 201. An Output 206 from the Gate 205 is combined in an "Or" Gate 215 with the Leading Edges 150 of FIG. 14A on an Input line 214. An initial Output 219 from the Gate 215 is effected by the first Line 214 or, if that edge is missing, when data is first detected in the Total Memory on Line 201.

Data 219 is strobed by a signal on the Line 218 in the Gate 221 to clock a J-K Flip-Flop 225 on a Line 222. When the Output 227 goes positive, the start of the $S_1 - S_3$ Control Interval to FIG. 17B is defined. The Control 227 also removes the clamp on a Flip-Flop 226 so that this device can now respond to new data. Since the Flip-Flop 225 is set on the trailing edge of the Stroke 218, the Flip-Flop 226 cannot respond to the first leading edge that clocked the Flip-Flop 225 but must await the second edge or a Mid-Character Strobe 217.

The Line 228 of Flip-Flop 226 is initially positive to define the character region between Strokes $S_1$ and $S_2$. Leading Edges from FIG. 14 on the Line 214 are combined in an "Or" Gate 216 with the Mid-Character Strobe 217, also from FIG. 14A, to produce an Output 220. This signal is indicative of the presence of the Second Leading Edge Pulse or, if missing, its substitute, the Mid-Character Strobe on 217. The Output 220 is strobed in a Gate 223 by the Signal 218 to produce the Output 224 which clocks the Flip-Flop 226.

When a Line 213 of the Flip-Flop 226 goes positive, its Counterpart 228 reverts to zero indicating to FIG. 17B the termination of the $S_1 - S_2$ Region and the start of the $S_2 - S_3$ Region. The Line 213 also enables a Gate 211, but not in time to pass the second of the leading edges on the Line 214 but must await the third edge.

If Stroke $S_3$ is missing, the appropriate line of Group Signal 169 in FIG. 14 enters a Line 229 in FIG. 17A and is inverted by an Inverter 230 to develop the Output 231 activating a Gate 232. This gate develops the Output 233 if there is no Total Memory Data 201 indicating that the bottom of the character has passed. An Inverter 207 inverts a signal on a Line 201 to produce an Output 208 to enable a Gate 232 to effect the derivation of this information.

An Output 233 from the Gate 232 is summed in an "Or" Gate 209 with Leading Edge Data on 214 to produce an Output 210. Thus, if the third leading edge pulse is missing, the character's bottom edge is substituted. The Signal on the Line 210 is strobed in a Gate 211 by the Strobe 218 to develop an Output 212 which clears the Flip-Flop 225 to denote the end of region $S_2$–$S_3$. In clearing the Flip-Flop 225, the Flip-Flop 226 is also cleared on Line 227 in preparation for the next character.

DISCRIMINATOR

Initially the $S_1 - S_2$ Control 228 from FIG. 17A that is on a Line 242 in FIG. 17B enables a pair of Gates 238 and 259. The Control $S_2 - S_3$ 213 from FIG. 17A that is on a Line 244 in FIG. 17B at that time disables a pair of Gates 261 and 263. The Discriminator is now set up to examine the Left and Right Memories of FIG. 16 for Strokes $S_4$ and $S_6$.

The Right Memory data on the line 176 of FIG. 16 enters a line 247 of FIG. 17B and is inverted by an Inverter 246 to develop an Output 245. The inversion process is a way of stating that the Data 247 is being investigated for breaks. A Signal 245, if present, passes a Gate 259 but not a Gate 263 while an Output 260 from the Gate 259 clears a Flip-Flop 265 denoting the absence of Stroke $S_6$. Similarly, Left Memory Data on the line 177 from FIG. 16 enters on a Line 251 in FIG. 17B is inverted by an Inverter 250 to develop an Output 249. This signal normally passes a Gate 248 to produce an Output 243 which, if present, passes a Gate 238, but not a Gate 261. A Signal 239 from the Gate 238 clears a Flip-Flop 240 to indicate the absence of Stroke $S_4$.

Every Memory Update 125 interval of FIG. 13 occurs for one scan period, and this data appears on a Line 252 of FIG. 17B to enable a Gate 254. A second Leg 253 of the Gate 254 is driven by the 2' Count Sequence Line 86 of FIG. 8.

If there is 2' data during the sample interval, an Output 255 from the Gate 254 sets a Flip-Flop 256 which is only cleared on a line 241 after the character is recorded. An Output 257 of the Flip-Flop 256 disables a Gate 248 so that Left Memory data is thereafter excluded which infers breaks in Strokes $S_4$ and $S_5$. This procedure corrects for anomalies incurred with such aberrations as that illustrated in FIG. 15F.

When Signal on the line 244 becomes active and the Signal on the line 242 inactive, the Gates 261 and 263 are enabled while the Gates 238 and 259 are disabled. The system is now examining Left and Right Memory Data for Strokes $S_5$ and $S_7$. A pair of Flip-Flops 266 and 267 are respectively cleared on the Lines 262 and 264 if stroke breaks are discovered. The Flip-Flop 266 records information on Stroke $S_5$. The Flip-Flop 267 determines data on Stroke $S_7$. All the Flip-Flops 240, 265, 266 and 267 are set by a system clear pulse on Line 241 after the character has departed the ensor 8 and has been recorded.

The Outputs from the Flip-Flops 268, 269, 270 and 271 enter the Decoder 272 to produce a combined Output 274 directed to the Algorithm 13. A Line 273 permits the disabling of the Decoder 272 by the Algorithm 13 for certain special cases.

All Gates 238, 259, 261 and 263 can only generate outputs if they receive pulses on the common strobe line 237. This signal is produced by a Gate 236 which has two input legs 234 and 235. The leg 234 is the $S_1$–$S_3$ Control 227 of FIG. 17A which enables the Gate 236 for the interval between Strokes $S_1$ and $S_3$. A Strobe 235 occurs in time after the termination of the Strobe 218 in FIG. 17A which precludes a race condition.

GENERAL SADDLE DETECTOR AND SAMPLE FALL

The term "saddle" infers a character feature as illustrated in FIG. 18 for numeral 4 and machine printed numeral 1. The curved arrow superimposed on each numeral denotes the specific feature region of interest. A saddle may be defined as a character fall that exceeds a certain percentage of character height followed by a rise that also exceeds that same percentage of character height. This definition assumes that the terms "fall" and "rise" only apply to the topmost character periphery. Additionally, the definition requires no information about the rates of rises or falls.

True falls and rises, interspersed with undulations not exceeding the required threshold levels, are liberally interpreted as if the extraneous meanderings are non-existent. In general, a threshold level of about four stroke widths is sufficient to establish the identities of rises and falls without the need to utilize character height as a reference. This is the technique explained below in connection with FIG. 20.

FIG. 19 demonstrates the four Regions of operation, labelled "A," "B," "C" and "D" along the Longitudinal Axis, in which the Saddle Detector functions. The curve which consists of three idealized linear segments, for purposes of illustration, portrays the topmost portion of a hypothetical character as it translates past the Sensor 8. Upon the arrival of a character at the Sensor 8, the Saddle Detector is preset to Region A which states that a legitimate rise is assumed and that the device is now searching for the summit of that rise, labelled Peak 1.

Once Peak No. 1 is attained, subsequent data begins to fall to establish Zone B. The Peak Value No. 1 is placed in memory and continuously compared against the first data in each scan until the difference exceeds the fall threshold level. At that point, Zone C is established which signifies that a legitimate fall is detected and the Saddle Detector is now seeking Valley No. 1.

After Valley No. 1 is attained, data rises again, with Valley No. 1 placed in memory, to establish Zone D. Subsequent rising data is compared against Valley No. 1 in memory and when the difference exceeds the rise threshold, a rise is now said to be in progress and a saddle is thereby detected. Although some characters exhibit more peaks and valleys than those drawn in FIG. 19, the Saddle Detector need not process data any further for the purpose of this feature determination.

The sample fall portion of this sub-system examines which of the Zones A, B, C, or D the Saddle Detector is performing within when Sample Strobe 78 from FIG. 6 arrives. If the device is either in Zones A or B, this fact is placed in memory for subsequent use by the Algorithm. Conversely, operation at sample time in either Zones C or D is also recorded in memory.

SADDLE DETECTOR TRUTH TABLE

In FIG. 20, three cardinal circuit points are labelled with encircled alphabet characters as well as the normal numeric type designations. This notation is utilized to emphasize the key signals that control system operation and which signals are represented in the following Saddle Detector Truth Table:

| ZONE | ⒹⒻⓍ | COMMENT |
|---|---|---|
| $A_1$ | 1 0 0 | Load D |
| $A_2$ | 1 1 0 | — |
| $B_1$ | 0 1 0 | Load F<br>Start Count |
| $B_2$ | 1 1 0 | Stop Count |
| $C_1$ | 0 1 1 | — |
| $C_2$ | 1 1 1 | Load D |
| $D_1$ | 1 0 1 | Start Count |
| $D_2$ | 1 1 1 | Load F<br>Stop Count |
| — | 0 0 0 | Unused |
| — | 0 0 1 | Unused |

The characters are Ⓓ for a Line 280, Ⓕ for a Line 291 and Ⓧ for a Line 287. Symbol Ⓓ represents the first stroke of the incoming Leading Edge Information 34 from FIG. 3 for each scan. Cipher Ⓕ denotes stored first stroke Leading Edge Data Ⓓ on the prior or some earlier scan depending upon the mode of operation. Symbol Ⓧ signifies whether or not the first character fall has occurred.

The Truth Table further sub-divides each zone into halves described as $A_1$, $A_2$, $B_1$, $B_2$ etc., which in turn are derived by a three bit Decoder 309 in FIG. 20. Fall system operation is now reviewed by referring to FIG. 19 and the Truth Table. Lastly, Signals Ⓓ and Ⓕ exist as transient pulses which are respectively memorized by Flip-Flops 283 and 288 in FIG. 20 so that the corresponding notations in the Truth Table can be regarded as static entities. These Flip-Flops are cleared at the end of each scan.

In Region A of FIG. 19, Pulse Ⓓ occurs on the first scan, with Ⓕ non-existent, to produce the (100) Word on the $A_1$ row of the Table. No fall has yet been detected so that Ⓧ is also at binary zero. The Word (100) instructs the system logic to load Ⓓ into memory. On the second scan, the new Ⓓ occurs before the old Ⓓ now in memory and redesignated as Ⓕ. The reason for the time differential is the fact that the character being read has a rising tendency in Zone A.

The word (100) is again generated to load in the new D and shortly thereafter Ⓕ comes out of memory to develop Word (110) in Zone $A_2$. Word (110) shuts off the loading of the memory causing Ⓕ to be discarded. This process continues where higher values of Ⓓ are loaded in on successive scans as the lower order values Ⓕ are dumped.

At one point in time in Region $B_1$, Ⓕ will precede Ⓓ to signify that a falling tendency is in progress, but not yet a fall passing a threshold. Word (010) is developed which instructs the logic to recirculate Ⓕ back into memory as well as to start a counter going. This last Ⓕ represents the peak of the character being read. Shortly thereafter Ⓓ comes along to generate Word (110) which shuts off the counter, and instructs the memory not to accept that Ⓓ which is discarded. This is Region $B_2$. At the scan end, the counter is reset to zero.

This regimen continues where Ⓕ is continuously recirculated while the successive Ⓓ pulses are discarded until the threshold is exceeded to develop Word (011) which signified entry into Region $C_1$. Pulse Ⓓ occurs to generate Word (111) for Zone $C_2$ which instructs the logic to load Ⓓ into memory. At this loading, Ⓕ of Zone $B_1$ is in memory along with the first Ⓓ in Zone $C_2$. On the following scan Ⓕ precedes the new Ⓓ to generate Word (011) again. A second Ⓕ is also evolved which is indicative of the first Ⓓ in Zone $C_2$ but has no effect since Word (011) already exists. Word (011) restricts both Ⓕ data pulses from re-entering the memory. Data Ⓓ now is produced to develop Word (111) to load Ⓓ into memory. The second scan in Zone Ⓒ now only has one value of Ⓕ in memory.

This process continues where lower order values of Ⓓ replace higher order values of Ⓕ in memory until Ⓓ precedes Ⓕ for the entry into Zone $D_1$ to produce Word (101). Value Ⓓ now precedes Ⓕ since the character is again experiencing a rising tendency. Word (101) instructs the counter to start running but not to accept Ⓓ into memory. Shortly thereafter, Ⓕ comes out of memory to produce Word (111) which stops the counter and orders the recirculation of Ⓕ. At the end of the scan, the counter is reset to zero.

This process repeats where the counter develops higher counts as newer values of Ⓓ arrive. These Ⓓ values are not loaded into memory but the last Ⓕ in Zone $C_2$ is retained, which is the character valley. On one scan, the counter exceeds a threshold value to denote the second threshold exceeded for a character with a saddle feature. Another latch type counter records the second threshold pulse as a saddle for the Algorithm.

For types of characters with saddle features, Regions C and D might be interspersed with a stroke of zero slope. This immediately generates Word (111) which orders the loading of Ⓓ and the discarding of Ⓕ. Since Ⓓ and Ⓕ are identical in time, this action does not create any anomalies. In addition, identical Words (111) are developed for Regions $C_2$ and $D_2$ which also produces no problems as will be explained below.

Signal Ⓧ is sampled at a given time after the scanning of the character is in progress. If Ⓧ is a binary zero (not a fall) that fact is stored in memory while Ⓧ as a binary one is also memorized, but now as a fall. This examination permits the resolution of such characters as a numeral seven from a negative sloping numeral one.

In normal operation for the Truth Table, Words (000) and (001) are unused. If these words do inadvertently occur, they have no effect on system operation.

SADDLE AND NUMERAL 1 CIRCUIT

FIG. 20 shows the logic of the Saddle and Numeral 1 where a Flip-Flop 276 and a Gate 279 comprise the Stroke Selector circuit which pass the initial pulse Ⓓ in each scan and reject the remainder. In this manner, assuming top to bottom photocell multiplexing, the topmost periphery of each character is selected for further analysis. The Leading Edge Data 34 from FIG. 3 enters a Line 275 in FIG. 20 to clock the Flip-Flop 276 at the pulse falling edge.

The entire first pulse on the Line 275 passes the Gate 279. Once the Flip-Flop 276 clocks, a Line 278 inhibits the Gate 279 to further data in that scan. The Flip-Flop 276 is cleared by a signal on a Line 277 at the scan end to repeat this process adinfinitum. A Gate Output 280 or Ⓓ sets a Flip-Flop 283 on the leading edge and also drives one leg of a Gate 302. The Flip-Flop 283 retains in memory the event of Ⓓ for the scan duration but is reset by the signal on the Line 277 at the scan end.

A pair of "And" Gates 302 and 304, an "Or" Gate 306 and a Shift Register 308 form the Sub-System memory which develops Event Ⓕ on a Line 291. The Register 308 is equal in bit length to the number of Sensor photocells 8 and is clocked by the clock 85 in step with the Sensor 8 multiplexing. Initially the Register 308 is empty and the Gate 302 is enabled by a Line 299 while the Gate 304 is inhibited by a Line 300. Pulse Ⓓ passes the Gate 302 as an Output 303 in Region $A_1$ (refer to the previous section) and also propagates through the Gate 306 whose Output 307 is loaded into the Register 308. In Region $B_1$, Output Ⓕ of the Shift Register 308 passes the Gate 304 which is enabled by the signal on the Line 300 while the signal on the Line 299 disables the Gate 302. This Ⓕ signal is then recirculated through the Register 308 as long as operation remains in Region B.

On its leading edge, Signal Ⓕ sets a Flip-Flop 288 which retains that event in Memory for the duration of a scan interval. This device is cleared at the end of each scan by a signal on a Line 277. An Output 284 of the Flip-Flop 283 is assigned the $2^2$ input position for a Decoder 309 while an Output 286 of the Flip-Flop 288 is given the $2^1$ input position. The $2^0$ input is assigned to a Line 287 emanating from a clocked Flip-Flop 319 which generates the Ⓧ data. All three inputs to the Decoder 309 are now in the order stipulated in the Truth Table above. The Decoder Outputs $A_1$ and $C_2/D_2$ become respectively energized on Lines 292 and 293 for Regions $A_1$ and $C_2$. These signals are summed in an "Or" Gate 296 whose Output 299 commands the Gate 302 to load or not to load Data Ⓓ.

Similarly, Outputs $C_2/D_2$ and $B_1$, respectively on Lines 293 and 294 from the Decoder 309, become energized in Regions $C_2$, $D_2$ or $B_1$. These signals are summed in an "Or" Gate 297 whose Output 300 instructs the Gate 304 when to reload Ⓕ. It would seem that the Line 293 simultaneously orders Ⓓ and Ⓕ to be loaded, which could compromise systems performance, which is not the case, since these data are asynchronous. Actually Ⓓ and Ⓕ are sequentially loaded into memory in the transition between Regions B and C. The Flip-Flop 288 sets on the first Ⓕ pulse emanating from the Register 308 on the following scan and ignores the second Ⓕ pulse. Subsequent scans only load one event into the Memory, however.

The Outputs $B_1$ and $D_1$ from the Decoder 309, respectively on the Lines 294 and 295, are summed in an "Or" Gate 298 producing an Output 301 which instructs a Threshold Detector to examine subsequent data for a rise or a fall. A Gate 311, a Counter 282, a Gate 316 and an Inverter 318 comprise the Threshold Detector. When the Line 301 is high, the Gate 311 is enabled to pass a Clock 310 which is in synchronism with the Sensor multiplexing. The Output 313 from the Gate 311 triggers the Counter 282 whose multiple Output 315 drives the Threshold Gate 316. For rising or falling tendencies, not exceeding the threshold, the Gate 316 develops no output on a scan. The Counter 282 is then reset at the scan end by the reset 314. When the Gate 316 develops a Signal 317, the threshold is reached and the Inverter 318 inverts the Signal 317 producing a Signal 312 thereby inhibiting the Gate 311 to further data in that scan. This inhibiting ploy permits the use of a counter with a more limited capacity than would otherwise be possible.

The Output 317 from the Gate 316 clocks a Toggled Flip-Flop 319 whose Output 287 or Ⓧ becomes high for the first fall. On the next rise, for a character with a saddle, Ⓧ reverts to a low state causing a Clocked Flip-Flop 323 to latch on for the duration of the character. An Output 324 then communicates the presence of a Saddle to the Algorithm ⑬. Both of the Flip-Flops 319 and 323 are cleared after the character is determined and recorded.

The Ⓠ Output 320 of Flip-Flop 319 energizes a Gate 321 prior to a character fall. The Sample from the Pulse 78 from FIG. 6 enters Line 322 in FIG. 20 to drive the other leg of the Gate 321. If no fall exists at sample time, the Output 325 from the Gate 321 sets a Flip-Flop 326 to record that fact on the Line 327 to the Algorithm 13. If the Flip-Flop 326 does not set, a fall is presumed. This device is also cleared at the end of a character by the Signal 285.

SECOND STROKE FALL DETECTOR

In the previous Section, the first stroke in each scan is assumed to scan the character top to bottom and, is examined for a fall and a rise to ascertain the presence of the saddle feature. For another feature required by the Algorithm, the second stroke fall detector of this section examines the second stroke in each scan for a fall, without regard to a rise. As for the saddle circuit, scanning is assumed to proceed from top to bottom and a threshold level must be exceeded before a fall is said to exist. Additionally, whereas the Saddle Detector examines the full character width to determine the presence of its target feature, the second stroke detector is disabled, approximately before the middle of the character.

The feature that the Second Stroke Fall Detector of FIG. 22 pursues is limited to resolving ambiguities incurred in the numeral seven that could confuse it with the numeral nine. Most other feature generators of this disclosure are applicable for more than one Algorithm task. Although only one application is deemed useful at this juncture, this does not limit the extension of this feature generator to more tasks in the future.

In FIG. 21 two numerals 7 are shown with hooks that bend under the top stroke which in a rudimentary sense cause the character to mimic the closed loops of the numerals 9 drawn below the sevens. For both sevens, the leading hook top edge represents the second stroke in each scan and that edge precipitously jumps to negative infinity for the indicated fall in the left 7. A finite fall in incurred where indicated for the right 7.

Neither numeral 9 exhibits such a fall so that this becomes a useful feature for distinguishing between the two symbols. If the hook were not present or bent to the left, this feature generator is not required. The right numeral 9 exhibits a sharp second stroke rise and this aberration has been noted in some handwriting samples. Since the detector only searches for falls, this characteristic is intentionally overlooked.

In FIG. 22 is Toggled Flip-Flop 346, a Latch Flip-Flop 348 and a three legged Gate 349 comprise the circuit for selecting the second pulse in each scan. Initially an Output 344 of the Flip-Flop 346 inhibits the Gate 349 by being low. An Output 345 from the Flip-Flop 348 is initially high to enable the Gate 349.

Leading Edge Data from the line 34 in FIG. 3 enters a Line 343 in FIG. 22. The first pulse cannot pass the Gate 349 but its falling edge, clocks the Flip-Flop 346 thereby enabling the Gate 349. The second pulse on the Line 343 passes the Gate 349 but is falling edge clocks the Flip-Flop 346 back to its original inhibiting state. In regressing, the Line 344 also clocks the Flip-Flop 348 which latches to prohibit any further data from passing the Gate 349 in that scan. If no more than three pulses can be guaranteed per scan, the Flip-Flop 348 is not required. At the end of each scan, an End of Scan Clear 347 clears both of the Flip-Flops 346 and 348 in preparation for the next scan.

An Output 350 from the Gate 349 provides data for a Shift Register 351 and sets a Flip-Flop 354. The Register 351, like its other counterparts, has a bit capacity equal to the number of Sensor photocells 8 and is clocked by the clock 85 in synchronism with the multiplexing rate of Sensor 8. The Register 351 has an Output 352 which sets a Flip-Flop 353 which in turn enables a Gate 360 with an Output 355. Initially, the Output 355 disables a Gate 360.

The Flip-Flop 354 normally enables the Gate 360 with a high level on an Output Line 356. In addition, a Flip-Flop 368 initially enables the Gate 360 with a high level on an Output Line 359. The Line 358 is also initially in a high state. The first pulse from the Gate 349 sets the Flip-Flop 354 to further disable the Gate 360 which is already blocked by the Line 355.

For a second scan character falling tendency, as on a hook of one of the numerals 7 of FIG. 21, the Flip-Flop 353 is set on the second scan to enable the Gate 360 before the Flip-Flop 354 sets to disable the Gate 360. For this interim, Strobe Pulses 357 are passed by the Gate 360 which are equal in number to the quantity of photocells dropped from the first to the second scan. An Output 361 from the Gate 360 drives a Counter 362 which generates on a Line 365 in a parallel binary form the number of pulses detected in the fall. The Output 365 is compared in a Threshold Detector 366 against a Reference 370. The Detector 366 generates no Output on a Line 371 when the threshold is not exceeded.

The threshold level is set high enough so that hooks on the sevens of FIG. 21 are not sufficient to cause the Output on 371 to go high. At the end of the scan, the Flip-Flops 353 and 354 are cleared by a Signal 347 which also resets the Counter 362 at the end of the scan by passing through the Gate 354 to generate a Reset 363. Since the Detector Output 371 is low, the inverting action of an Inverter 372 produces a high output on a Line 358 to enable the Gates 360 and 364. If the threshold is exceeded, the Gates 360 and 364 are blocked from further operation to retain for the Algorithm 13 the evidence of a fall. The Counter 362 is directly cleared, after the character is ascertained and recorded, by a Line 367.

Successive scans cause the detector to "walk" down the hook with the count accumulated in the Counter 362 never exceeding the Threshold 370 in any one iteration. For the left 7 in FIG. 22, the Flip-Flop 353 turns on for the scan after the hook tip is passed but no data appears on the Gate 349 Output 350 to set the Flip-Flop 354 to disable the Gate 360. The Counter 362 then runs up to cause the Output 371 to go high and lock out the system. The second stroke fall is indicated to the Algorithm 13 as if the second stroke in that fall were at negative infinity.

For the right seven of FIG. 21, the fall terminates on a finite second stroke but the threshold is still exceeded. Left numeral nine exhibits no falls on the second stroke but the right nine shows a marked rising tendency. The Flip-Flop 354 sets before Flip-Flop 353 under such a condition so that the Gate 360 passes no pulses for any second stroke positive slope.

It would appear at first that the Flip-flop 353 and 354 can be replaced by one unit with a set Signal 352 setting that device and the Output 350 clearing it. For only negative slopes this would be possible, but positive slopes require the duo to preclude erroneous operation.

The Sample Pulse 78 from FIG. 6 arrives on a Line 369 of FIG. 22 to set a Flip-Flop 368 whose Output 359 disables the Gate 360 to terminate the detector operation. This action occurs about mid-character and is required to prevent trailing character features from being misinterpreted. It would require a very severely bent hook for this feature to escape detection. Although the timing of a set Signal 369 is shown to be identical with the signal on the Line 319 in FIG. 20, two separate timing circuits can be set up in FIG. 6 to optimize the performance of both circuits (FIG. 20 and 22)

BLOB DETECTOR

The Blob Detector shown in FIG. 23 seeks specific character features for which the character is rejected as being unreadable. In this respect, the Blob Detector differs in function from other feature generators in the system.

A blob is a character region that exceeds in its longitudinal and lateral directions some realistic limits. In addition, for dark characters on a light background, the blob is a continuous dark area uninterrupted with any light segments contained therein. The primary purpose of this detector is to weed-out documents written with blunt writing instruments that cause these blobs. Such defective implements can easily fill in closed loops on numerals as six, eight and nine rendering them susceptible to misreading.

A large number of photocells is chosen for the Sensor 8 in order to achieve a high systems resolution capability. Dull writing instruments defeat the whole purpose of such a choice and as a result compromise system performance. The rationale for the detector is thus established. Any single photocell may disclose a long continuous black region as it scans the character. This does not necessarily constitute a blob as that photocell may be scanning a stroke parallel to the longitudinal axis. However, if a number of adjacent photocells observe long dark regions then that observation is interpreted as a "blob."

In the Blob Detector circuit shown in FIG. 23, a plurality of Shift Registers 374, 394, 404 and 420 are identical in bit capacity to the number of photocells contained within the Sensor 8. As for their system counterparts, these Registers are clocked in synchronism with Sensor 8 multiplexing by the clock waveform 85.

The Shift Register 374 and the Gate 376 comprise a Correlation Circuit whose Output 377 is developed when there is data on two successive scans for any one photocell. The Register 374 stores the complete data for one scan period while its Output 375, drives one leg of the Gate 376. The Input data 36 from FIG. 3 is picked up by a Line 373 in FIG. 23 and provides the second input to the Gate 376.

A Line 377 drives an "Or" Gate 378 whose Output 379 in turn drives an "And" Gate 381. An Output 382 from the Gate 381 controls recirculating Memory Gates 383, 395 and 402. When a Line 377 is high for any one photocell position, each of the Recirculating Gate Output 385, 396 and 403 is permitted to transfer data to Half Adders 388, 397 and 401. Three identical Register-Adder groups are shown in FIG. 23 to accomodate counts as high as seven. Such sections may be added or deleted depending upon system requirements. The "And" Gate 381 receives Clearing Data 380 on its other leg which causes a Line 382 to go low thereby clearing all Memories when the character is fully scanned and recorded.

Data on the Line 373 normally passes a Gate 386 to produce an Output 387 which provides one input to the Half Adder 388. Data on the lines 387 are processed by the Half Adder 388 along with the signal on the Line 385 by virtue of the Adder Logic, if there is data on Line 387 but none recirculated on the Line 385, or conversely, no data on the Line 387 but circulated data on Line 385, then a Line 421 provides data to a Register 420 with no information generated on a Carry Line 422. Similarly, if both of the Lines 385 and 387 are low, neither the Lines 421 nor 422 have data. Lastly, if both of the Lines 385 and 387 contain information, none is generated on the Line 421 but is provided on Carry Line 422.

This process is replicated for the other two RegisterAdder sections where, for example, a Carry Line 422 is one input to an Adder 397 while its second input is on a Line 396. A Line 398 is the Sum Output of the Adder 397 while a Line 399 is the Carry Data. For the remaining Register-Adder Group, the Carry Line 399 is one input to an Adder 401 while an Output 403 of a Gate 402 is the second input. A Line 400 is the Sum Output providing data to a Register 404. A Carry Line is not shown but would be employed if another Register-Adder section were to be appended. Let us review the operation of the circuit elements hereinbefore described by tracing a typical character scan regimen. After this review, the rest of FIG. 23 operation is explored.

Initially and prior to a character passing the Sensor 8, all of the Registers 374, 394, 420 and 404 are cleared of data. The first scan's data is loaded into the Register 374, but because of no prior data, the Gate 376 does not produce any output for that scan. The Line 382 is low for the entire first scan which tends to clear all Registers by inhibiting recirculation. Since these Registers had no data anyhow, this action is of no consequence. First scan data also passes through the Gate 386 and the Adder 388 which fully loads the first scan data into the Register 420 with no carry on the Line 422.

Assume that in the first scan, the typical photocells K and K+1 find data while photocell K+2 discloses none. During the next scan assume that K finds no data while K+1 and K+2 detect data. Lack of data on cell K causes the Gate 383 to open thereby destroying data in the $K^{th}$ memory element which is not replenished since no new data is received on the Line 387. Circulation is effected for the K+1 cell but no data is loaded into the K+1 memory element in the Register 420 by the line 421 causing that storage cell to record a binary zero. Instead, Memory Element K+1 in the Register 394 is loaded by the Adder 397 which in parallel binary form states that two successive counts of Photocell K+1 have been discovered.

With the K+2 data of the second scan, Memory Element K+2 in the Register 420 is loaded. Assume for the third scan that photocell K+1 has data but not K+2 nor K. The Registers 420 and 394 have elements K+1 loaded, with the Register 420 loaded by new data and the Register 394 by recirculation. All Memory Elements K and K+2 are now cleared for scan three.

The Outputs 384, 389 and 393 of the Registers 420, 394 and 404 drive the Threshold Detector 390 whose Parallel Binary Reference is on the Line 391. For any one photocell, when the count on the input data lines to the Detector 390 exceeds the threshold, the Output 392 goes high. This action causes the "Or" Gate 378 to generate the Output 379 whether or not any of the Data 377 is present on successive scans or not. Thus, one the threshold is exceeded, the Registers cannot be cleared due to lack of data on the following scans for the photocell position causing that condition. An Inverter 407 also produces an Inhibiting Signal 406 which prevents the entry of new data into the Adder 388 by the Gate 386. New data would in theory cause the inputs to the Detector 390 to continue to exceed the Threshold 391 so that the inhibiting of the Data 373 would not appear to be necessary. However, unless sufficient Register-Adder capacity is available, the Detector 390 Input Data can recycle causing the Output 392 to drop out which could erroneously clear the Registers. The inhibiting action of the Signal 406 permits correct systems operation while at the same time conserving Register-Adder hardware.

In summary, a momentary output on the Line 392 from the Detector 390 states that a certain number of consecutive scans have disclosed continuous data in the scan position indicative of a photocell number. This is a necessary but not sufficient condition to define a "blob" since the device could be looking at a line of information parallel to the Longitudinal Axis.

A pair of the Gates 409 and 412, the Counter 415 and the Threshold Detector 418 comprise a circuit to ascertain if the Longitudinal Threshold 391 is exceeded on any arbitrary number of adjacent photocells. In effect, we are now examining data in the Lateral Axis direction. The Output Data 392 is strobed by a strobe 411 in the Gate 412 producing a Pulsed Output 413 which triggers the Counter 415. An Output 417 of the Counter 415 runs-up on successive photocells exceeding the Threshold Count 391. If a photocell is addressed and the Output 392 develops no data, the Output 406 of the Inverter 407 enables the Gate 409 to pass the Strobe 411 through the gate. A Pulsed Output 414 from the Gate 409 resets the Counter 415 to zero such that Counter 415 is again free to run up, if possible, on the following scans.

The Counter Output 417 is compared in the Threshold Detector 418 against a Reference 419 to produce an Output 416 if the Reference 419 is exceeded. The Line 416 going high is then interpreted as a "Blob" and this knowledge is so communicated to the Algorithm 13. The Inverter 408 inverts the Output 416 to produce a signal on Line 410 which inhibits the Gates 409 and 412 for the rest of the character. The Counter 415 can no longer run-up or reset and the Output 416 is maintained high. As for the Register-Adder combinations, this last ploy conserves hardware by keeping the Counter 415 and the Detector 418 capacities at low levels.

After a character is determined and recorded, the Signal 380 clears the Counter 415 which again enables the Gates 409 and 412. The Blob Detector is now ready for the next character.

THIRD STROKE RISE DETECTOR

The function of the Third Stroke Rise Detector as shown in FIG. 25 is to examine the slope of the character third stroke to determine if it exceeds in magnitude some threshold value. In general, a positive slope of greater than 45° is sought. Negative Slopes, regardless of value are not registered. In one application, this feature permits the distorted open-looped numeral 9 of FIG. 24 to be distinguished from numeral 5.

As will be recalled when the Left and Right Memories of FIG. 16 were discussed, a line is defined that places all data on that line and to its left in the Left Memory. Similarly, everything to the right of the line is placed in the Right Memory. Lines for the numerals 5 and 9 are so indicated in FIG. 24.

The slope of the third stroke immediately to the right of the divider is less than 45° for numeral five and greater than 45° for numeral nine. By only examining the third stroke in the divider's immediate vicinity, the desired feature information is acquired.

In order to extract the requisite data, a detector is provided that only passes the third pulse in the Leading Edge Data. The selected information is next processed in circuits similar in function to those of FIGS. 20*a* and 20*b* for the Saddle Detector. Whereas the Saddle Detector looks for both positive and negative slopes. This third slope detector only looks for positive slopes.

In the Third Stroke Detector circuit shown in FIG. 25, the Leading Edge Data 34 from FIG. 3 enters FIG. 25 on a Line 423 to trigger a Counter 425 and to drive one leg of a Gate 427. A Counter 425 and a Gate 427 comprise a circuit that only passes the third Leading Edge Pulse in any one scan. A Multiple Output 426 of the Counter 425 enables the Gate 427 at the termination of the second pulse. The third pulse passes the Gate 427 to form an Output 428, and at its termination, the Counter 425 indexes to disable the Gate 427. The Counter 425 is cleared by an End Scan Clear Signal 424 at the end of each scan to render the circuit receptive to new data in the following scan.

Initially, a Flip-Flop 429 enables a Gate 432 with an Output 430 and disables a Gate 465 with an Output 431. The first third stroke pulse passes the Gate 432 to form an Output 433 which in turn passes an "Or" Gate 435 whose Output 436 drives a Shift Register 437. The Register 437 is again equal in bit capacity to the number of Sensor photocells and is clocked by the Clock 85 in synchronism with Sensor 8 multiplexing. An Output 440 of the Register 437 propagates through a Gate 438 whose Output 434 enters the "Or" Gate 435 to permit that data to continuously recirculate for the duration of the character. A Clear Signal 439 disables the Gate 438 when the character's identity is determined and recorded which causes the Register 437 to empty.

The Flip-Flop 429 clocks at the termination of the first third stroke pulse to inhibit the Gate 432 and to enable the Gate 465. The Flip-Flop 429 latches itself in this state for the duration of the character so that only one pulse is ever loaded into the Register 437 for the symbol. This initial pulse is then maintained in memory for later use.

When the Gate 465 is enabled, it admits an End of Scan Clock 466 to form a pulsed Output 464 that triggers the Counter 463 which indexes one count for each scan, and its multiple Output 460 enables the Gate 459 when a prescribed count is accumulated. An Output 441 from the Gate 459 is inverted by an Inverter 461 whose Output 462 inhibits further data from passing the Gate 465 for that character.

The Signal 441 also enables a pair of Gates 442 and 458 which respectively permits the circulating data in the Register 437 to pass through the Gate 442 and the third stroke Data 428 to pass through the Gate 458. The Data 443 from the Gate 442 sets the Flip-Flop 445 while the Data 457 from the Gate 458 sets the Flip-Flop 456.

For a third stroke rise, the Flip-Flop 456 sets before the Flip-Flop 445 is set. Respective Outputs 446 and 448 of these Flip-Flops enable the Gate 450 to pass Clock pulses 447 as an Output 451. Some time after the Flip-Flop 446 sets, the Flip-Flop 445 sets to disable the Gate 450 and terminate the passage of the Pulses 447. The number of pulses passed in the interim is then a measure of the magnitude of the third stroke slope. For a negative slope, the Flip-Flop 445 sets before the Flip-Flop 456 so that no pulses ever pass the Gate 450.

The Gate 450 Output Pulse 451 triggers the Counter 452 whose Multiple Output 453 is analyzed by the Gate 454 which develops the Output 455 when the Counter 452 reaches a suitable count level. An Inverter 457 inverts the Output 455 to produce a Signal 449 which inhibits the Gate 450. The Gate 454 is in effect a Decoder-Threshold device and the level at which it generates an output is set to equal or exceed the level of the Gate 459. If both counts are equal, and assuming that the system is set-up for equal resolution both in the Lateral and Longitudinal axes, then stroke three has a slope of 45 degrees. When the threshold count of the Gate 454 exceeds that of the Gate 459, higher order slopes are indicated The Counters 463 and 452 and the Flip-Flops 445 and 456 are cleared by a Clear Signal 439 when the character is determined and recorded.

ALGORITHM

A number of character features have been detected by the various Feature Generators hereinbefore described. The Algorithm 13 is concerned with the correlation of the feature data so derived to define the different characters. To specify a single symbol for a numeral may or may not be totally accurate. Consider that only one set of features is required to describe the numerals 0 and 4 while perhaps up to four sets of feature combinations are needed for the numeral 7 in view of the variations in form the numeral 7 is capable of exhibiting.

The Algorithms chosen for the characters in this section are primarily based upon preferred methods of forming the various ciphers (see FIG. 26) i.e., requirements such that all numerals having closed loops should be closed while all open loops should be open, are typical. Indeed, many commercial organizations set up training programs to encourage their personnel to print correctly. Uniform handprinting also minimizes human reading errors and so is also highly desirable.

Regardless of training, people tend on occasion to produce character aberrations. If such distortions are singular, as they are for many symbols, the OCR can accomodate these for what they are, different ciphers but signifying unambiguous information. Aberrations where separate entities begin to demonstrate like appearances are rejected as unreadable.

Circuits to implement the various chosen Algorithms consist for the most part of multi-legged "And" and "Or" Gates. For this reason, the subsequent descriptions are far less involved than those for the Feature Generators. In a number of instances, different characters exhibit identical features except for a small number. These similar characteristics can be exploited to simplify system design. Only circuits for numerals 0 and 1 are given below to illustrate the methods for implementing the different Algorithms. Truth Tables of which the Numeral Truth Table of FIG. 28*a* is typical can be prepared to indicate the procedures to be followed in ascertaining the remaining character identities. The different numerical forms for the remaining symbols 3 to 9 for which Numeral Truth Tables can be prepared are shown in FIG. 28*b*.

Where more than one form of a numeral is to be detected, the outputs of all of the detectors for that numeral are summed. Thus only ten decimal lines are presented to the final systems circuit of FIG. 29, a Decimal to Digital Encoder. This Encoder consists of multilegged "Or" Gates which convert Decimal Data into Binary Coded Data on four lines. The addition of dummy bits, further converts such data into ASCII or EBCDC formats however the reading of alpha characters requires all lines to be energized for these codes.

The Decimal to Binary Encoder of FIG. 29 also sums the various reject signals derived during character processing. A binary 1 on any reject input causes the Decimal to Binary Encoder to reject the document. To effect this rejection a question mark could be recorded in place of an unreadable character.

NUMERAL 0

The numeral 0 shown in various forms in FIG. 26*a* is one of the simplest characters to decode since a single 2 sequence, whose generation is described in connection with Vertical Count Sequence, Count Storage, and Stroke Sequence Processor above, is required. If both the upper and lower protuberances of the central vertical stroke of the military zero are less than one-fourth of character height, then this character has a single two sequence count.

The numeral 2 in FIG. 26*a* is rotated counterclockwise, and also produces a single two count sequence. Although a rare type of distortion, it is accomodated by requiring that the zero does not contain the Saddle Feature as described in Saddle Detector and Sample Fall above. FIG. 26*b* is the circuit utilized for decoding 0 from data developed by the Feature Generator 12. The Saddle 324 from FIG. 20 enters on a Line 469 to drive an Inverter 471. The Output 472 enables a Gate 473 when a saddle feature does not exist. The Two Sequence Count 104 from FIG. 9 enters on a Line 470 to drive the remaining leg of the Gate 473 whose Output 474 denotes the presence of numeral zero. This output also disables the Decoder 272 in FIG. 17*b* that produces information on Strokes $S_4$ through $S_7$ to preclude the possibility of these other circuits from misreading the character.

NUMERAL 1

Figures 27A, 27B, 27C, 27D:
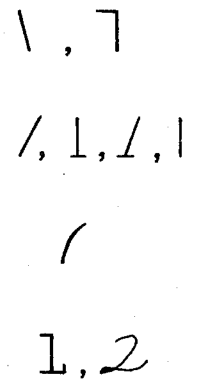

The numeral 1 in FIG. 27*a* exhibits the horizontal stroke combination of $S_1.\overline{S_2}.\overline{S_3}$ as unfortunately the numeral 7 alongside of it does. This however, is the only anomaly which is readily resolved by utilizing the fall sample derived in FIG. 20. Numeral 7 demonstrates no fall, when sampled shortly after the character enters the sensor field of view, while the negative sloped numeral 1 does.

The numerals 1 in FIG. 27*b* are uniquely defined as $\overline{S_1}.\overline{S_2}.S_3$ while that in FIG. 27*c* is defined as $\overline{S_1}.S_2.\overline{S_3}$. No other numerals have these distinctive characteristics. The Numeral 1 in FIG. 27*d* has a 1–2 count sequence as well as a saddle feature, but appears to be disturbingly similar to the distorted hand printed numeral 2 alongside. This competition is eliminated by field formatting the Algorithm since, in general, it is known on what part of a document machine and hand printed numerals are recorded. If this is not possible, then a feature generator must be constructed to look for sharp or rounded character edges.

In the Numeral One Logic circuit of FIG. 27*e*, the line 327 from FIG. 20 enters FIG. 27*e* on a Line 475 which drives one leg of a Gate 477. A second leg, 476, of the Gate 477 is energized by $S_1.\overline{S_2}.\overline{S_3}$ on the Line 274 of FIG. 17*b*. An Output 478 is then the implementation of the symbology of FIG. 27*a* and is combined in an "Or" Gate 481 along with $\overline{S_1}.\overline{S_2}.S_3$ and $\overline{S_1}.S_2.\overline{S_3}$, both respectively on Lines 479 and 480. The Line 479 is the implementation of FIG. 27*b* while the Line 480 is the implementation of FIG. 27c with both inputs obtained from the composite Line 274 of FIG. 17b.

An "Or" Gate Output 482 drives one leg of a Gate 484 whose second Leg 483 is energized by the Line 104 of FIG. 9. A Signal 483 is the one count sequence and is redundant data that provides added insurance against the misreading of the numeral one. An Output 485 is combined in an "Or" Gate 491 with a Signal 490 representing the OCR-A numeral one of FIG. 27d. An Output 492 is the numeral one line driving the Decimal to Binary Converter of FIG. 29.

A Line 487 is the OCR-A Format Control which disables a Gate 489 for the reading of hand printing and enables the Gate 489 for machine printing. A Line 486 receives the one-two sequence count data from the Line 104 of FIG. 9. A Line 488 of FIG. 27e obtains Saddle Data from the Line 324 of FIG. 20.

DECIMAL TO BINARY CONVERSION

The Decimal to Binary Converter circuit shown in FIG. 29 accepts two groups of input data which are the Outputs of all the Algorithms of FIGS. 26b, 27e, 28a and 28b as a Group Input 512 and all of the Character Reject Criteria Data as a group input 515. A typical example of this last information is the under or oversized character Data 77 generated in FIG. 6.

An exclusive "Or" Gate 514 processes the Data 512 and generates an Output 517 if two or more of the Input Lines 512 contain data. This condition can only be the result of a badly formed character and as a result the Data 517 is summed in an "Or" Gate 516 along with the multiple Inputs on Line 515. An Output 519 of the "Or" Gate 516 enables a Gate 521 to pass a Reject Symbol 533-in this case in the EBCDC Machine Language. The Output 519 is also inverted by an Inverter 520 whose Output 534 disables a Gate 523 for a character reject condition. For an acceptable character, the Gate 521 is disabled when the Gate 523 is enabled.

The Decimal Data 512 is encoded in a Decimal to Binary Converter 513 and in the EBCDC Machine Language. This block consists of eight multiple input "Or" Gates for the general conversion of alphabet and numeric type data. For purely a numeric type OCR, only four "Or" Gates are required with the remaining EBCDC Bits filled-in with dummy information. With the set-up as hereinabove described, the Reject Criteria 517 and 515 always over-rides an Output 518 from the converter 513 if a bad character is indicated.

An Output 522 from the Gate 521 and an Output 524 from the Gate 523 are summed in a multiple input "Or"Gate 525 whose multiple Output 526 represents either the Reject Symbol or True Data in Machine Language. Once the character's determination is effected, it is loaded into a Latch Memory 527, by a Latch Strobe 528. After this loading, the End of Character Clear Signal is instituted to render the OCR System receptive to the following character. The previous character is retained in the Latch Memory 527 while the following character is being processed.

A Latch Memory Output 531 represents the OCR Output in some Machine Language form which may be recorded in a Nine Track Tape Recorder 532 as illustrated, in a Cassette Recorder, Punched Paper Tape, transmitted by a Modem over telephone lines or whatever other application is required.

A Record Command 529 can be in synchronism with the End of Character Clear or delayed therefrom, since the data is contained in the Latch Memory 527 and remains invariant during the System clearing operation.

An Inter-Record Gap Command (IRG) 530 may be instituted between each document being read according to the IBM 360 format. The Signal 530 is generated by a photocell detecting the Document leaving the Sensor 8 reading area or by a Symbol placed on the Document itself. Typically a character as a Letter E can be decoded by the Converter 513 to institute the IRG. For high speed applications, IRG time may be intolerably high so that no IRG is used at all. The records are then separated for the computer by the Letter E being recorded between each record.

When a reject is incurred, the Output 519 of the "Or" Gate 516 may also be employed in other ways in addition to invalidating the recorded record. Though not shown in FIG. 29, the control can stop the OCR Mechanism to permit the operator to correct the visually interpreted information on a keyboard after which the machine is started again. The Signal 519 may also cause the Document to be physically routed to a reject hopper without stopping the machine operation. The rejected Documents are then entered via a keyboard into a Recorder 532 after the entire Document stack is processed or the errors corrected by hand with the Documents placed back into the machine for recording.

If a large number of rejects are incurred, a system malfunction might be indicated rather than just random rejects based upon poor handwriting. To permit such an analysis, a multiple Reject Symbol 533 may be employed rather than the fixed one previously indicated. To obtain this variable, the Reject Lines 515 are processed by a Decimal to Binary Converter similar to the converter 513 except that any number of inputs may now be simultaneously energized. The Output of this Converter becomes the Input 533 for the Gate 521. Of Course, only Reject Symbols may be employed that do not conflict with normally read information. An eight bit word provides sufficient choice when only a numeric OCR is involved.

Although the invention has been described with a transport mechanism for propelling the documents under an optical system, it is obvious that the document may be stationary and the complete optics system may be propelled before the document or a portion of the optical system may be moved, i.e., a rotating scanning mirror may be used for viewing the character by electro-optic sensors.

It should be understood that the foregoing relates to only a preferred embodiment of the invention, which have been by way of example only and that it is intended to cover all changes and modifications of the example of the invention herein chosen for the purposes of the disclosure, which do not constitute departures from the spirit and scope of the invention.

The invention claimed is:

1. An optical character reader for optically reading characters of a font of two dimensional plane characters based on an ideal regular plane matrix of two mutually perpendicular sets of linear strokes comprising:

a plurality of electro-optical sensor means arranged consecutively in an array, which is disposed to scan said characters one at a time while said characters are moved relative to said array in a direction of movement perpendicular to said array in the plane of said matrix and parallel to one of said sets of strokes and, to produce electrical signals corresponding to configurations of said characters, sensor processing means in circuit with said sensor means and arranged to amplify said signals, quantize said amplified signals, and correlate said quantized signals to reduce effects of optical noise, a feature generator means connected to said sensor processing means and arranged to apply several predetermined tests to determine the absence or presence of certain specified features:

said feature generator means comprising:

a first circuit means for determining the height of said characters;

a logic circuit means for counting the number of times each of said electro-optical sensor means detects one or more of the strokes parallel to said array of said characters as said characters longitudinally traverse said sensor means; and a count sequence circuit means connected to said first circuit means and said logic circuit means for determining the consecutive number of said electro-optical sensing means which have counted the same number of strokes, parallel to said array of said characters; and an algorithm circuit in circuit with said feature generator means for applying predetermined criteria to data communicated therefrom, to ascertain the identity of said characters being read.

2. An optical character reader as recited in claim 1 further including a scan means for providing that an image of each of said characters moves in said direction while it is scanned in a second direction orthogonal to said direction by said sensor means and wherein said scan means includes means for scanning all of said electro-optical sensor means at least once each time said images moves the width of one of said electro-optical sensor means.

3. An optical character reader as recited in claim 1 wherein said sensor processing means includes a leading edge signal means for producing a single leading edge signal in response to electric signals from at least two consecutively positioned sensor means and wherein said feature generator means includes a counting circuit means connected to said leading edge signal means which counts of said leading edge signal.

4. An optical character reader as recited in claim 3 wherein said counting circuit means is connected to a counting logic means for counting said leading edge signals only if a subsequent scan has a greater number of leading edge signals than the preceding scan.

5. An optical character reader as recited in claim 3 wherein said counting circuit means is connected to a logic circuit means for determining whether the last scan of a character has only one leading edge.

6. An optical character reader as recited in claim 4 further including zonal circuit means for dividing the height of said character image into a plurality of zones and a processing circuit means coupled to said zonal circuit means and said counting logic means for determining the zone of said leading edge.

7. An optical character reader as recited in claim 4 further including longitudinal division circuit means connected to said counting logic means for determining the longitudinal section of said leading edges.

8. An optical character reader as recited in claim 3 further including a saddle circuit means connected to said leading edge signal means of said sensor processing means for determining whether said character image has a fall which exceeds a percentage of said character height and is followed by a rise that exceeds said percentage of said character height.

9. An optical character reader comprising:

a plurality of electro-optical sensor means arranged consecutively in an array and disposed for scanning a plurality of graphic characters on a medium, one at a time while said characters are moved relative to said array in a direction of movement perpendicular to said array to derive electric signals corresponding to configurations of said characters:

a scan means for providing that an image of each of said characters moves in said direction while it is scanned in a second direction orthogonal to said direction by said sensor means;

a sensor processing means connected with said sensor means and arranged to amplify said signals, quantize said amplified signals, and correlate said quantize signals to reduce effects of optical noise, said sensor processing means including a leading edge signal means for producing a single leading edge signal in response to electric signals from at least two consecutive sensor means;

a feature generator means connected to said sensor processing means and arranged to apply several predetermined tests to determine the absence or presence of certain specified features;

said feature generator means comprising:

a counting circuit means connected to said leading edge signal means which counts said leading edge signal; and an algorithm circuit connected with said feature generator means and for applying predetermined criteria to data communicated therefrom to ascertain the identity of said characters being read.

10. An optical character reader as recited in claim 9 wherein said counting circuit means is connected to a counting logic means.

11. An optical character reader as recited in claim 9 further comprising:

a means for illuminating said characters on said medium while they are being scanned; and an automatic gain control means in said sensor processing means arranged to correct for variations in illumination of said characters in surface reflectance of said medium, and in light absorptivity of graphic characters.

12. An optical character reader as recited in claim 9 wherein said feature generator means further includes a plurality of feature data generator circuits arranged to receive processed signals from said sensor processing means corresponding to configurations of said scanned characters, each one of said feature data generator circuits being responsive to said processed signals and arranged to generate data signals corresponding to at least one predetermined character feature selected from the following group of character features: character height, horizontal strokes, final value, vertical strokes, saddle, character width, upper stroke slope, blobs and smudges, precipitous fall, final 1 count, and third stroke slope.

13. An optical character reader as recited in claim 9 further comprising adjustment means arranged to move said medium in one of said directions to position characters on said medium in an optimum position for being scanned by said electro-optical means.

14. An optical character reader as recited in claim 9, wherein said algorithm circuit, comprises separate logic circuits, one for each preferred form of character to be read, each one of said logic circuits containing components arranged to correlate data signals received from said feature data generator circuits with different character forms each defined by a corresponding truth table.

15. An optical character reader as recited in claim 14, wherein each of said logic circuits produces decimal data corresponding to character forms recognized by said algorithm circuit and further comprising a decimal to binary conversion circuit connected to said algorithm circuit for producing binary data signals corresponding to the character forms recognized by said algorithm circut.

* * * * *